United States Patent
Takahashi et al.

(10) Patent No.: US 6,444,290 B1
(45) Date of Patent: Sep. 3, 2002

(54) MAGNETIC RECORDING MEDIUM COMPRISING A SUPPORT CONTAINING A SPECIFIC SIZE FILLER AND HAVING A SPECIFIC CONCENTRATION OF SURFACE PROTRUSIONS

(75) Inventors: Masatoshi Takahashi; Hitoshi Noguchi; Junichi Nakamikawa, all of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/329,150

(22) Filed: Jun. 9, 1999

(51) Int. Cl.$^7$ ................................................. G11B 5/733

(52) U.S. Cl. ........................ 428/141; 428/143; 428/323; 428/332; 428/402; 428/694 SG; 428/694 BA

(58) Field of Search ................................. 428/332, 402, 428/694 BS, 694 BR, 694 SG, 900, 141, 143, 323, 480; 523/181

(56) References Cited

U.S. PATENT DOCUMENTS

| | | | |
|---|---|---|---|
| 4,163,823 A | 8/1979 | Legras et al. | 428/317.9 |
| 4,439,795 A | 3/1984 | Kitamoto et al. | 360/131 |
| 4,447,270 A | 5/1984 | Howard et al. | 106/438 |
| 4,452,830 A | 6/1984 | Yoshizumi | 427/215 |
| 4,506,000 A | 3/1985 | Kubota et al. | 430/39 |
| 4,507,157 A | 3/1985 | Oliver, Jr. | 117/56 |
| 4,528,240 A | 7/1985 | Miyoshi et al. | 428/323 |
| 4,587,157 A | 5/1986 | Brock et al. | 428/216 |
| 4,617,226 A | 10/1986 | Yamaguchi et al. | 428/216 |
| 4,619,856 A | 10/1986 | Kamada et al. | 428/143 |
| 4,649,073 A | 3/1987 | Suzuki et al. | 428/212 |
| 4,654,260 A | 3/1987 | Chubachi et al. | 428/328 |
| 4,664,975 A | 5/1987 | Kobayashi et al. | 428/323 |
| 4,666,769 A | 5/1987 | Miyata et al. | 428/323 |
| 4,708,906 A | 11/1987 | Sekiyo et al. | 428/336 |
| 4,741,953 A | 5/1988 | Katsuta et al. | 428/323 |
| 4,746,558 A | 5/1988 | Shimozawa et al. | 428/141 |
| 4,756,953 A | 7/1988 | Utsumi | 428/220 |
| 4,784,895 A | 11/1988 | Mizuno et al. | 512/25 |
| 4,794,042 A | 12/1988 | Kubota et al. | 428/328 |
| 4,839,225 A | 6/1989 | Matsufuji et al. | 428/336 |
| 4,844,963 A | 7/1989 | Takasuna et al. | 428/65.3 |
| 4,847,147 A | 7/1989 | Aonuma et al. | 428/329 |
| 4,851,289 A | 7/1989 | Ogawa et al. | 428/329 |
| 4,857,388 A | 8/1989 | Ogawa et al. | 428/212 |
| 4,863,791 A | 9/1989 | Steward et al. | 428/310.5 |
| 4,863,793 A | 9/1989 | Ogawa et al. | 428/323 |
| 4,865,924 A | 9/1989 | Saito et al. | |
| 4,874,633 A | 10/1989 | Komatsu et al. | 427/54 G |
| 4,910,068 A * | 3/1990 | Takagi et al. | 428/141 |
| 4,916,024 A | 4/1990 | Kasuga et al. | 428/323 |
| 4,943,479 A | 7/1990 | Yamada et al. | 428/331 |
| 4,952,444 A | 8/1990 | Kawamata et al. | 428/141 |
| 4,963,433 A | 10/1990 | Ogawa et al. | 428/323 |
| 4,965,120 A | 10/1990 | Ono et al. | 428/213 |
| 5,030,484 A | 7/1991 | Chino et al. | 427/434.3 |
| 5,032,428 A | 7/1991 | Ogawa et al. | 427/130 |
| 5,051,291 A | 9/1991 | Kowahaue et al. | 428/141 |
| 5,051,303 A | 9/1991 | Naguchi et al. | 428/329 |
| 5,093,192 A | 3/1992 | Kawahara et al. | 428/323 |

(List continued on next page.)

FOREIGN PATENT DOCUMENTS

| | | |
|---|---|---|
| EP | 0 392 810 A2 | 10/1990 |
| GB | 1417765 | 12/1795 |
| GB | 1417442 | 12/1975 |
| JP | A-62-92128 | 4/1962 |
| JP | A-63-113931 | 5/1963 |
| JP | A-54-30002 | 3/1979 |
| JP | 55-55438 | 4/1980 |
| JP | A-55-139634 | 10/1980 |
| JP | B-57-6178 | 2/1982 |
| JP | 58-85931 | 5/1983 |
| JP | A-58-139337 | 8/1983 |
| JP | A-58-159228 | 9/1983 |
| JP | 58-51327 | 11/1983 |
| JP | 59-8124 | 1/1984 |
| JP | 59-154646 | 9/1984 |
| JP | 60-109020 | 6/1985 |
| JP | 60-154327 | 8/1985 |
| JP | A-60-164926 | 8/1985 |
| JP | 60-193130 | 10/1985 |
| JP | A-61-172215 | 8/1986 |
| JP | 61-204827 | 9/1986 |
| JP | 61 204 827 | 9/1986 |
| JP | 61-204829 | 9/1986 |
| JP | 61-214127 | 9/1986 |
| JP | A-61-216116 | 9/1986 |

OTHER PUBLICATIONS

The Advantages of the Thin Magnetic Layer on a Metal Particulate Tape, IEEE Transactions on Magnetics, vol. 29, No. 6, Nov. 1993.

Development of Particulate Recording Media with Ultrathin Magnetic Layer, IEICE Trans Electron, vol. E78–C. No. 11, Nov. 1995.

Enabling technologies for a 100MB 3.5"floppy (ZIP™) disk drive, 220/SPIE vol. 2604.

Primary Examiner—Stevan A. Resan
Assistant Examiner—Kevin M. Bernatz
(74) Attorney, Agent, or Firm—Stroock & Stroock & Lavan LLP

(57) ABSTRACT

A magnetic recording medium is described, which comprises a support having thereon a substantially nonmagnetic lower layer and a magnetic layer comprising a ferromagnetic metal powder or a ferromagnetic hexagonal ferrite powder dispersed in a binder provided on the lower layer, which is a magnetic recording medium for recording signals of from 0.17 to 2 G bit/inch$^2$ of areal recording density, wherein the dry thickness of the magnetic layer is from 0.05 to 0.30 $\mu m$, $\phi m$ is from $10.0 \times 10^{-3}$ to $1.0 \times 10^{-3}$ emu/cm$^2$, the coercive force of the magnetic layer is 1,800 Oe or more, and a filler having an average particle size of from 0.05 to 0.3 $\mu m$ is present on the surface layer of the support in an amount of from 5,000,000 to 30,000,000/mm$^2$.

7 Claims, No Drawings

U.S. PATENT DOCUMENTS

| | | | |
|---|---|---|---|
| 5,104,750 A | 4/1992 | Kubo et al. | 428/694 MT |
| 5,112,679 A | 5/1992 | Nakagawa et al. | 428/323 |
| 5,151,323 A | 9/1992 | Kowahaue et al. | 428/323 |
| 5,156,908 A | 10/1992 | Araki et al. | 428/323 |
| 5,160,761 A | 11/1992 | Koga et al. | 427/548 |
| 5,196,265 A | 3/1993 | Ryoke et al. | 428/332 |
| 5,200,255 A * | 4/1993 | Matsubara et al. | 428/212 |
| 5,219,670 A | 6/1993 | Ohno et al. | 428/694 B |
| 5,258,223 A | 11/1993 | Inaba et al. | 428/323 |
| 5,266,376 A | 11/1993 | Okazaki et al. | 428/141 |
| 5,268,206 A | 12/1993 | Komatsu et al. | 427/548 |
| 5,300,314 A | 4/1994 | Hayakawa et al. | 427/58 |
| 5,318,838 A | 6/1994 | Matsufuji et al. | 428/328 |
| 5,358,777 A | 10/1994 | Kojima et al. | 428/212 |
| 5,384,175 A | 1/1995 | Kojima et al. | 428/65.3 |
| 5,455,104 A | 10/1995 | Sekiguchi et al. | 428/212 |
| 5,455,112 A | 10/1995 | Inaba et al. | 428/323 |
| 5,458,948 A | 10/1995 | Yanagita et al. | 428/141 |
| 5,489,466 A | 2/1996 | Inaba et al. | 428/212 |
| 5,496,607 A * | 3/1996 | Inaba et al. | 428/65.3 |
| 5,503,911 A | 4/1996 | Aoki et al. | 428/213 |
| 5,514,464 A | 5/1996 | Sasaki et al. | 428/323 |
| 5,518,804 A | 5/1996 | Mizuno et al. | 428/212 |
| 5,532,041 A | 7/1996 | Honjo et al. | 428/141 |
| 5,547,772 A | 8/1996 | Saito et al. | 428/694 B |
| 5,597,638 A | 1/1997 | Saito et al. | 428/141 |
| 5,645,917 A | 7/1997 | Ejiri et al. | |
| 5,672,423 A | 9/1997 | Inaba et al. | 428/323 |
| 5,756,148 A | 5/1998 | Ejiri et al. | |
| 5,763,046 A | 6/1998 | Ejiri et al. | |
| 5,780,141 A | 7/1998 | Ejiri et al. | |
| 5,792,543 A | 8/1998 | Ejiri et al. | |
| 5,795,646 A | 8/1998 | Ejiri et al. | |
| 5,811,166 A | 9/1998 | Ejiri et al. | |
| 5,811,172 A | 9/1998 | Ejiri et al. | |
| 5,827,600 A | 10/1998 | Ejiri et al. | |
| 5,851,622 A | 12/1998 | Ejiri et al. | |
| 5,935,674 A * | 8/1999 | Saito et al. | 428/65.3 |
| 5,976,668 A * | 11/1999 | Chiba et al. | 428/141 |

FOREIGN PATENT DOCUMENTS

| | | |
|---|---|---|
| JP | 61-237623 | 10/1986 |
| JP | A-61-241325 | 10/1986 |
| JP | A-62-22235 | 1/1987 |
| JP | 62-001115 A | 1/1987 |
| JP | A-62-33337 | 2/1987 |
| JP | 62-36727 | 2/1987 |
| JP | A-62-159338 | 7/1987 |
| JP | 62-188017 | 8/1987 |
| JP | A-62-219321 | 9/1987 |
| JP | 62-222427 | 9/1987 |
| JP | A-62-234231 | 10/1987 |
| JP | 63-146210 | 6/1988 |
| JP | 63-157313 | 6/1988 |
| JP | 63-164022 | 7/1988 |
| JP | 63-317926 | 12/1988 |
| JP | 63 317 926 | 12/1988 |
| JP | 1-109518 | 4/1989 |
| JP | A-1-119916 | 5/1989 |
| JP | A-1-276422 | 7/1989 |
| JP | 1-220120 | 9/1989 |
| JP | 1-235211 | 9/1989 |
| JP | 1-248318 | 10/1989 |
| JP | 1-300419 | 12/1989 |
| JP | 2-15415 | 1/1990 |
| JP | A-2-58727 | 2/1990 |
| JP | A-2-98816 | 4/1990 |
| JP | 2-149916 | 6/1990 |
| JP | A-2-194063 | 7/1990 |
| JP | A-2-208824 | 8/1990 |
| JP | 2-257424 | 10/1990 |
| JP | 2 257 424 | 10/1990 |
| JP | A-2-307806 | 12/1990 |
| JP | 3-5913 | 1/1991 |
| JP | 3-17817 | 1/1991 |
| JP | 3-49032 | 3/1991 |
| JP | 3-80422 | 4/1991 |
| JP | 3-88118 | 4/1991 |
| JP | A-3-157812 | 7/1991 |
| JP | A-3-219424 | 9/1991 |
| JP | 4-271010 | 9/1992 |

* cited by examiner

MAGNETIC RECORDING MEDIUM COMPRISING A SUPPORT CONTAINING A SPECIFIC SIZE FILLER AND HAVING A SPECIFIC CONCENTRATION OF SURFACE PROTRUSIONS

FIELD OF THE INVENTION

The present invention relates to a coating type magnetic recording medium (obtained by coating a magnetic layer-coating solution) [i.e., a magnetic recording particulate medium] capable of high density recording. More specifically, the present invention relates to a coating type magnetic recording medium for high density recording which comprises a magnetic layer on a substantially nonmagnetic lower layer wherein the upper magnetic layer contains a ferromagnetic metal powder or a hexagonal ferrite powder.

BACKGROUND OF THE INVENTION

In the field of a magnetic disc, a 2 MB MF-2HD floppy disc using Co-modified iron oxide has been generally loaded in a personal computer. However, along with the increase in the amount of data to be dealt with, the capacity thereof has become insufficient and the increase of the capacity of the floppy disc has been demanded.

In the field of a magnetic tape, with the prevalence of an office computer, such as a minicomputer, a personal computer and a work station, a magnetic tape for recording computer data as external storage medium (a so-called backup tape) has been vigorously studied. For the realization of the magnetic tape for such a use, the improvement of recording capacity has been strongly demanded conjointly with the miniaturization of a computer and the increase of information processing ability (e.g., throughput).

Magnetic layers comprising an iron oxide, a Co-modified iron oxide, $CrO_2$, a ferromagnetic metal powder, or a hexagonal ferrite powder dispersed in a binder, which are coated on a support, have been conventionally widely used in magnetic recording media. Ferromagnetic metal powders and hexagonal ferrite powders among these have been known to have excellent high density recording characteristics.

In the case of a disc, as high capacity discs using ferromagnetic metal powders which are excellent in high density recording characteristics, there are 10 MB MF-2TD and 21 MB MF-2SD, and as high capacity discs using hexagonal ferrite, there are 4 MB MF-2ED and 21 MB Floptical, however, any of these are not satisfactory with respect to capacities and properties. As is the circumstance, various attempts have been made to improve high density recording characteristics. Examples thereof are described below.

For improving characteristics of a disc-like magnetic recording medium, JP-A-64-84418 (the term "JP-A" as used herein means an "unexamined published Japanese patent application") proposes the use of a vinyl chloride resin having an acidic group, an epoxy group and a hydroxyl group, JP-B-3-12374 (corresponding to U.S. Pat. No. 4,788,092) (the term "JP-B" as used herein means an "examined Japanese patent publication") proposes the use of a metal powder having a coercive force (Hc) of 1,000 Oe or more and a specific surface area of from 25 to 70 $m^2/g$, and JP-B-6-28106 proposes to regulate the specific surface area and magnetic susceptibility of magnetic powders and contain an abrasive.

For improving the durability of a disc-like magnetic recording medium, JP-B-7-85304 (corresponding to U.S. Pat. No. 4,690,864) proposes the use of a fatty acid ester having an unsaturated fatty acid ester and an ether bond, JP-B-7-70045 proposes the use of a fatty acid ester having a branched fatty acid ester and an ether bond, JP-A-54-124716 proposes the use of a nonmagnetic powder having a Mohs' hardness of 6 or more and a higher fatty acid ester, JP-B-7-89407 proposes to regulate the volume of voids containing a lubricant and regulate the surface roughness to from 0.005 to 0.025 $\mu m$, JP-A-61-294637 (corresponding to U.S. Pat. No. 4,828,925) proposes the use of a fatty acid ester having a low melting point and a fatty acid ester having a high melting point, JP-B-7-36216 (corresponding to U.S. Pat. No. 4,797,321) proposes the use of an abrasive having a particle size of from ¼ to ¾ of the magnetic layer thickness and a fatty acid ester having a low melting point, and JP-A-3-203018 (corresponding to U.S. Pat. No. 5,635,294) proposes the use of a ferromagnetic metal powder containing Al and a chromium oxide.

As the constitution of a disc-like magnetic recording medium having a nonmagnetic lower layer and an intermediate layer, JP-A-3-120613 proposes the constitution comprising an electrically conductive layer and a magnetic layer containing a metal powder, JP-A-6-290446 (corresponding to U.S. Pat. No. 5,591,512) proposes the constitution comprising a magnetic layer having a thickness of 1 $\mu m$ or less and a nonmagnetic layer, JP-A-62-159337 proposes the constitution comprising an intermediate layer comprising a carbon and a magnetic layer containing a lubricant, and JP-A-5-290358 proposes the constitution comprising a nonmagnetic layer in which the carbon size is regulated.

On the other hand, a disc-like magnetic recording medium comprising a thin magnetic layer and a functional nonmagnetic layer has been developed in recent years and floppy discs of the class with the capacity of 100 MB are now on the market. As floppy discs showing these characteristics, JP-A-5-109061 (corresponding to U.S. Pat. No. 5,384,175) proposes the constitution comprising a magnetic layer having Hc of 1,400 Oe or more and a thickness of 0.5 $\mu m$ or less and a nonmagnetic layer containing electrically conductive particles, JP-A-5-197946 proposes the constitution comprising abrasives having particle sizes larger than the thickness of the magnetic layer, JP-A-5-290354 (corresponding to U.S. Pat. No. 5,549,955) proposes the constitution comprising a magnetic layer having a thickness of 0.5 $\mu m$ or less with the fluctuation of the thickness being within ±15%, in which the surface electric resistance is regulated, and JP-A-6-68453 (corresponding to U.S. Pat. No. 5,389,418) proposes the constitution in which two kinds of abrasives having different particle sizes are contained and the amount of the abrasives on the surface is regulated.

Further, in the field of a tape-like magnetic recording medium, with the prevalence of an office computer, such as a minicomputer and a personal computer, a magnetic tape for recording computer data as external storage medium (a so-called backup tape) has been vigorously studied. For the realization of the magnetic tape for such a use, the improvement of recording capacity has been strongly demanded conjointly with the miniaturization of a computer and the increase of information processing ability. In addition, the use in various environmental conditions due to widening of use environments of magnetic tapes (in particular, under fluctuating temperature/humidity conditions), reliability on data storage, and reliability on performance, such as stable recording/readout of data in multiple running due to repeating use at high speed, have been increasingly demanded.

Magnetic tapes which are used in digital signal recording systems vary according to each system, for example, magnetic tapes corresponding to a so-called DLT type, 3480, 3490, 3590, QIC, a D8 type and a DDS type are known. In every system, the magnetic tape comprises, on one surface side of a support, a magnetic layer of a single layer structure having a comparatively thick layer thickness, e.g., from 2.0 to 3.0 μm, containing a ferromagnetic powder, a binder and an abrasive, and a back coating layer provided on the surface side of the support opposite to the side having the magnetic layer for purposes of preventing winding disarrangement and maintaining good running durability. However, in general, in a magnetic layer of a single layer structure having a comparatively thick layer thickness as described above, there is a problem of thickness loss which generates the reduction of output.

For the improvement of the reduction of reproduction output due to thickness loss of a magnetic layer, thinning of a magnetic layer has been known. For example, JP-A-5-182178 discloses a magnetic recording medium comprising a support having thereon a lower nonmagnetic layer containing an inorganic powder dispersed in a binder and an upper magnetic layer containing a ferromagnetic powder dispersed in a binder and having a thickness of 1.0 μm or less, which is coated on the lower nonmagnetic layer while the nonmagnetic layer is still wet.

However, with the rapid trend of the increase of the capacity and density of disc-like and tape-like magnetic recording media, it has become difficult to obtain satisfactory characteristics even with these techniques. That is, there is such a problem as output is reduced, an error rate is increased and durability is also decreased particularly with the enhancement of the capacity and density. Therefore, it has become difficult to make the reduction of an error rate compatible with the improvement of durability.

SUMMARY OF THE INVENTION

An object of the present invention is to provide a magnetic recording medium which is markedly improved in electromagnetic characteristics, in particular, high density recording characteristics, and which unites high durability, in particular, an error rate, output and durability in high density recording region are conspicuously improved. Specifically, an object of the present invention is to provide a high capacity disc-like magnetic recording medium having a recording capacity of from 0.17 to 2 G bit/inch$^2$, and particularly preferably from 0.35 to 2 G bit/inch$^2$.

As a result of earnest studies to provide a magnetic recording medium which is excellent in electromagnetic characteristics and durability, in particular, markedly improved in an error rate, output and durability in a high density recording region, the present inventors have found that high density recording characteristics and excellent durability of the object of the present invention can be obtained by the magnetic recording medium having the constitution described below, thus the present invention has been attained.

That is, the present invention can be attained by a magnetic recording medium which comprises a support having thereon a substantially nonmagnetic lower layer and a magnetic layer comprising a ferromagnetic metal powder or a ferromagnetic hexagonal ferrite powder dispersed in a binder provided on the lower layer, which is a magnetic recording medium for recording signals of from 0.17 to 2 G bit/inch$^2$ of areal recording density, wherein the dry thickness of the magnetic layer is from 0.05 to 0.30 μm, φm is from $10.0 \times 10^{-3}$ to $1.0 \times 10^{-3}$ emu/cm$^2$, the coercive force of the magnetic layer is 1,800 Oe or more, and a filler having an average particle size of from 0.05 to 0.3 μm is present on the surface layer of the support in an amount of from 5,000,000 to 30,000,000/mm$^2$. The present inventors have found that the magnetic recording medium having excellent high density characteristics and excellent durability, in which, in particular, the error rate, output and durability in high density recording region have been markedly improved, which could not be obtained by conventional techniques, could be obtained by adopting the constitution of the present invention.

DETAILED DESCRIPTION OF THE INVENTION

The term "a substantially nonmagnetic lower layer" in the present invention means a lower layer which may have a magnetic property but not too much for participating in recording and hereinafter referred to simply as "a lower layer" or "a nonmagnetic layer". Further, a magnetic layer is referred to as "an upper layer" or "an upper magnetic layer".

Areal recording density is a value obtained by multiplying linear recording density by track density.

φm is the amount of magnetic moment (emu/cm$^2$) which can be directly measured from the magnetic layer per unit area of one side using a vibrating sample magnetometer (VSM, a product of Toei Kogyo Co., Ltd.) at Hm 10 KOe, which is equal to the value obtained by multiplying magnetic flux density (Bm) obtained using VSM (unit G=4πemu/cm$^3$) by the thickness (cm). Accordingly, the unit of φm is represented by emu/cm$^2$ or G·cm.

Linear recording density means the bit number of signals recorded per 1 inch in the recording direction.

These linear recording density, track density and areal recording density are values determined by each system.

That is, the present inventors have elaborated some means in an attempt to improve the magnetic layer thickness, the coercive force (Hc) and the central plane average surface roughness as to the linear recording density, and the optimization of the φm as to the track density for the improvement of the areal recording density.

The magnetic recording medium according to the present invention comprises fillers having a specific average particle size having been present on the surface layer of a support in a specific density.

The average particle size and the density of the fillers present on the surface layer of a support are measured as follows.

The surface layer of a support is treated with oxygen plasma for from 40 to 50 minutes to expose the fillers on the surface layer of a support. The plasma-treated surface layer of a support is electron microphotographed with thirty thousand magnifications to measure the size and the number of the fillers. The average particle size and the number of the fillers are obtained from the fillers in the electron microphotographs of arbitrary two visual fields using an image analyzer KS 400 manufactured by Kontorn Co., Ltd. The average particle size of the fillers is taken as the average particle value of the particle sizes of all the fillers viewed in the electron microphotographs. The number of fillers is calculated in terms of the number per mm$^2$ of the surface layer of a support, and the value obtained by rounding up fractions of 5 and over and cutting away the rest at the ten thousands place is taken as the density of the filler present on the surface layer of a support.

Preferred embodiments of the present invention are described below:

(1) The above magnetic recording medium is a magnetic recording medium for recording signals of from 0.35 to 2 G bit/inch$^2$ of areal recording density, wherein the lower layer contains an inorganic powder having a Mohs' hardness of 4 or more.
(2) In the above magnetic recording medium, the magnetic layer has a dry thickness of from 0.05 to 0.20 μm and the magnetic layer contains an abrasive having an average particle size of 0.4 μm or less.
(3) In the above magnetic recording medium, the magnetic layer has a central plane average surface roughness of 4.0 nm or less measured by 3D-MIRAU method.
(4) In the above magnetic recording medium, the magnetic layer has a coercive force of 2,000 Oe or more.
(5) In the above magnetic recording medium, a filler having an average particle size of from 0.05 to 0.25 μm is present on the surface layer of a support in an amount of from 8,000,000 to 30,000, 000/mm$^2$.
(6) The above magnetic recording medium is a disc-like magnetic recording medium.
(7) The above magnetic recording medium is a computer tape.

The present inventors have found that a magnetic recording medium, in particular, a disc-like magnetic recording medium, having areal recording density of from 0.17 to 2 G bit/inch$^2$, particularly from 0.35 to 2 G bit/inch$^2$, excellent high density characteristics and excellent durability, in particular, markedly improved error rate, output and durability in high density recording region, which could not be obtained by conventional techniques, could be obtained by adopting the above constitution of the present invention.

That is, it has been known that it is preferred to use a smooth support but there is a problem in point of compatibility with the transferring suitability of a magnetic recording medium. However, the present inventors have found that a smooth support can be obtained, the compatibility with the transferring suitability can be ensured and, in particular, output and durability in high density recording region can be improved by the presence of a filler having an average particle size of from 0.05 to 0.3 μm, preferably from 0.05 to 0.25 μm, more preferably from 0.05 to 0.20 μm, in an amount of from 5,000,000 to 30,000,000/mm$^2$, preferably from 8,000,000 to 30,000,000/mm$^2$, more preferably from 10,000,000 to 30,000,000 mm$^2$ on the surface layer of a support.

In the present invention, the surface layer of a support means the region in the vicinity of the surface including each surface of the side on which a lower layer is provided and of the side opposite to the side on which a lower layer is provided, generally the region of from the surface to the depth of from 0.04 to 0.1 μm or so. Further, the density of the filler present on the surface layer is determined by the above-described method, and the mode of the presence of the filler on the surface layer is not particularly restricted so long as it is fundamentally a component constituting the surface layer. A part of the filler may constitute the surface of the support, for example, a part of the filler maybe exposed on the surface of the support without being covered with other components, e.g., resins.

The present invention regulates the density of a filler within the above range but any optional means can be adopted for the production of a support so long as it satisfies the above condition.

Specifically, (1) a method of adding a filler to a dissolved polymer and/or a monomer and then forming a belt-like support by well-known methods, and (2) adding a filler to a coating solution comprising a polymer and/or a monomer and then coating the solution on an arbitrary substrate (rigid support, e.g., aluminum and glass can also be used as well as resins) can be exemplified.

Materials of fillers may be inorganic or organic particles. Examples of inorganic particles include oxides and carbonates of Ca, Si, Ti and examples of organic particles include acrylate resins and silicone resins.

As polymers which are main components of the support according to the present invention other than fillers, well-known films can be used, for example, polyesters (e.g., polyethylene terephthalate, polyethylene naphthalate), polyolefins, cellulose triacetate, polycarbonate, polyamide, polyimide, polyamideimide, polysulfone, polyaramide, aromatic polyamide, or polybenzoxazole can be used. Highly strong supports such as polyethylene naphthalate or polyamide are preferably used. If necessary, a lamination type support as disclosed in JP-A-3-224127 can also be used.

The support for use in the present invention may be previously subjected to surface treatments, such as a corona discharge treatment, a plasma treatment, an adhesion assisting treatment, a heat treatment, and a dust removing treatment.

The support for use in the present invention can be adjusted so as to have a central plane average surface roughness (Ra) of generally 7 nm or less, preferably from 1 to 6 nm or less, more preferably from 2 to 5 nm, measured by a surface roughness meter "TOPO-3D" (a product of WYKO Co., Ltd., U.S.A.) by MIRAU method. It is preferred that the support not only has a small central plane average surface roughness but also is free from coarse protrusions having a height of 0.5 μm or more. The support for use in the present invention preferably has the maximum height (SRmax) of 1 μm or less, ten point average roughness (SRz) of 0.5 μm or less, central plane peak height (SRp) of 0.5 μm or less, central plane valley depth (SRv) of 0.5 μm or less, central plane area factor (SSr) of from 10% to 90%, and average wavelength (Sλa) of from 5 μm to 300 μm.

For obtaining desired electromagnetic characteristics and durability in the present invention, surface protrusion distribution of the support can be controlled arbitrarily by fillers. Only the above-described fillers can be used as such fillers but fillers having other average particle sizes may be used in combination, e.g., fillers having particle sizes of from 0.01 to less than 0.05 μm may be contained in the same amount as the range of the present invention. Fillers having particle sizes of from more than 0.3 to 1 μm maybe present on the surface of the support within the range of from 0 to 500,000 per mm$^2$. of the support surface. In the present invention, the number of fillers (within the range of the average particle size of the present invention) forming such surface protrusions is included in the number of the filler density of the above-described surface layer.

The F-5 value of the support for use in the present invention is preferably from 5 to 50 kg/mm$^2$, a thermal shrinkage factor of the support at 100° C. for 30 minutes is preferably 3% or less, more preferably 1.5% or less, and a thermal shrinkage factor at 80° C. for 30 minutes is preferably 1% or less, more preferably 0.5% or less. The support has a breaking strength of from 5 to 100 kg/mm$^2$, an elastic modulus of from 100 to 2,000 kg/mm$^2$, a temperature expansion coefficient of from $10^{-4}$ to $10^{-8}$/°C. (preferably from $10^{-5}$ to $10^{-6}$/° C.), and a humidity expansion coefficient of generally $10^{-4}$/RH % or less (preferably $10^{-5}$/RH % or less). These thermal characteristics, dimensional characteristics and mechanical strength characteristics are preferably almost equal in every direction of in-plane of the support with difference of not more than 10%.

A magnetic recording medium, in particular, a disc-like magnetic recording medium, having high density characteristics and high durability in the recording capacity system of areal recording density of from 0.17 to 2 G bit/inch$^2$, preferably from 0.35 to 2 G bit/inch$^2$, which could never be achieved by any coating type magnetic recording media known in the world, can be obtained as a result of organically combining and synthesizing the points as shown below.

The points aimed at in the present invention include (1) high Hc and hyper-smoothing, (2) ensuring of durability by the improvement of a composite lubricant, a binder with high durability and a ferromagnetic powder, (3) ultra-thinning of the magnetic layer and the reduction of fluctuation in the interface between the magnetic layer and the lower layer, (4) the increase of packing density of powders (a ferromagnetic powder and a nonmagnetic powder), (5) ultra-fine granulation of powders (a ferromagnetic powder and a nonmagnetic powder), (6) stabilization of head touch, (7) dimensional stability and servomechanism, (8) improvement of thermal shrinkage factors of the magnetic layer and the support, and (9) the functions of a lubricant at high temperature and low temperature, and the present invention has been achieved by combining and synthesizing these points.

In the field of personal computers where the tendency of multimedia has been increasingly progressed, high capacity recording media have attracted public attentions in place of conventional floppy discs and, for example, ZIP disc, has been on sale from IOMEGA CORP., U.S.A. This is a recording medium comprising a lower layer and a magnetic thin layer developed by the present inventors using ATOMM® (Advanced Super Thin Layer & High Output Metal Media Technology), and products of 3.7 inches with the recording capacity of 100 MB or more are on the market. The capacity of from 100 to 120 MB discs is almost equal to the capacity of MO (3.5 inches), i. e., one disc has the capacity of recording newspaper articles of from seven to eight month period. A transfer rate indicating write/readout time of data is 2 MB or more per a second, which is equal to a hard disc, and the working speed is 20 times of conventional floppy discs and more than 2 times of the MO, therefore, extremely advantageous. In addition, as this recording medium comprising a lower layer and a magnetic thin layer is the same coating type medium as floppy discs used at present, mass production is feasible, accordingly inexpensive as compared with hard discs and the MO.

As a result of eager investigations based on the knowledge on these media, the present inventors have achieved the present invention of a magnetic recording medium, in particular, a disc-like magnetic recording medium, in the recording capacity system of areal recording density of from 0.17 to 2 G bit/ inch$^2$, preferably from 0.2 to 2 G bit/inch$^2$, more preferably from 0.35 to 2 G bit/inch$^2$, which has markedly high recording capacity as compared with the above ZIP disc and the MO (3.5 inches) . This recording medium also has high density characteristics and excellent durability which could never be achieved by any products known in the world and, in particular, the error rate in high density recording region is noticeably improved, and this is the invention applicable to a magnetic tape, e.g., a computer tape.

The magnetic recording medium of the present invention comprises an ultra-thin magnetic layer containing a ferromagnetic powder of ultra-fine particles excellent in high output and high dispersibility, and a lower layer containing a spherical or acicular inorganic powder, and by thus reducing the thickness of the magnetic layer, a magnetic force offset in the magnetic layer can be reduced, the output in a high frequency region can be markedly increased and, further, overwriting characteristics can be improved.

By the improvement of a magnetic head, the effect of the ultra-thin magnetic layer can be further exhibited by the combined use with a narrow gap head and digital recording characteristics can be improved.

The upper magnetic layer is a thin layer having a thickness of from 0.05 to 0.30 μm, preferably from 0.05 to 0.25 μm, so as to match the performance required from the magnetic recording system and the magnetic head of high density recording. Such a uniform and ultra-thin magnetic layer is attained by high dispersion and high packing density realized by the combined use of a fine ferromagnetic powder and nonmagnetic powder with a dispersant and a high dispersible binder. The ferromagnetic powders used are preferably ferromagnetic powders capable of achieving high output, excellent in high dispersibility and high randomizing property for inducing suitabilities of high capacity floppy discs and computer tapes as far as possible. That is, high output and high durability can be attained by the use of ferromagnetic metal powders or ferromagnetic hexagonal ferrite powders of extremely fine particles which are capable of achieving high output, in particular, having an average long axis length of 0.1 μm or less and a crystallite size of from 80 to 180 Å, further by containing a large amount of Co, and Al and Y for imparting the functions of sintering-prevention and improving durability. For the realization of a high transfer rate, running stability and durability during high speed rotation can be ensured by making use of a three dimensional network binder system suitable for an ultra-thin magnetic layer. A composite lubricant capable of maintaining the effect thereof during use under various temperature and humidity conditions and in high rotation use can be incorporated into upper and lower layers and, further, with making the lower layer have a role of the tank of the lubricant so as to be able to always supply an appropriate amount of the lubricant to the upper magnetic layer to thereby heighten the durability of the upper magnetic layer to improve the reliance. Cushioning effect of the lower layer can bring about good head touch and stable running property.

A high transfer rate is required in a high capacity recording system. For that sake, it is necessary that the rotation speed of a magnetic disc for a high capacity recording system should be taken up one or more places as compared with conventional FD systems. Specifically, the rotation speed of a magnetic disc is preferably 1,800 rpm or more, more preferably 3,000 rpm or more. Recording track density is improved with the increase of capacity/density of magnetic recording.

In general, a servo recording area is provided on a medium to ensure traceability of a magnetic head against a recording track. In the magnetic recording medium according to the present invention, a support whose dimensional stability is isotropically heightened is preferably used as the support, thereby further stabilization of the traceability is devised. The smoothness of the magnetic layer can be further improved by using a hyper-smooth support.

The increment of density of magnetic recording of a disc-like magnetic recording medium requires the improvement of linear recording density and track density. Characteristics of a support are important factors for the improvement of track density. The dimensional stability of a support, in particular, isotropy, is considered in the recording medium according to the present invention. Servo recording is an indispensable technique in recording/reproduction of high track density, but the improvement can be contrived from the medium side by making the support isotropic as far as possible.

Advantages of changing the magnetic layer of the present invention from a monolayer (i.e., a single layer) to the ATOMM® structure are thought to be as follows.
(1) Improvement of electromagnetic characteristics by the thin layer structure of the magnetic layer;
(2) Improvement of durability by stable supply of lubricants;
(3) High output by smoothing the upper magnetic layer; and
(4) Easiness of imparting required functions by functional separation of the magnetic layer.

These functions cannot be sufficiently attained only by making the magnetic layer a multilayer structure. For constituting a multilayer structure, a successive multilayer system comprising successively constituting the layers is generally used. In this system, the lower layer is coated, cured or dried, then the upper magnetic layer is coated in the same way, cured, and surface-treated. In the case of a floppy disc (FD), as different from a magnetic tape, the same treatments are conducted on both surface sides. After a coating step, a disc undergoes a slitting step, a punching step, a shell incorporation step, and a certifying step, thus a final product is completed.

Electromagnetic characteristics can be widely improved by the thin layer structure of the magnetic layer as follows.
(1) Improvement of the output in a high frequency region by the improvement of characteristics of recording demagnetization;
(2) Improvement of overwriting characteristics; and
(3) Security of window margin.

Durability is an important factor for a magnetic recording disc. In particular, for realizing a high transfer rate, it is necessary that the rotation speed of a magnetic disc should be taken up one or more places as compared with conventional FD systems, and security of the durability of a magnetic disc is an important problem when the magnetic disc is sliding with a magnetic head and parts in a cartridge at a high speed. For improving durability of a disc, there are means such as a binder formulation to increase the film strength of a disc per se, and a lubricant formulation to maintain a sliding property of a disc with a magnetic head. In the magnetic recording medium according to the present invention, a three dimensional network binder system which has shown actual results in conventional FD systems is used in the binder formulation by being modified.

In the present invention, lubricants are used in combination of a plurality of kinds respectively exhibiting superior effects in various temperature and humidity conditions under which they are used, and each lubricant exhibits its function in different temperature (low temperature, room temperature, high temperature) and humidity (low humidity, high humidity) atmospheres, thereby totally stable lubrication effect can be maintained.

By using two layer structure, the durability of the upper magnetic layer can be heightened with making the lower layer have a role of the tank of a lubricant capable of always supplying an appropriate amount of a lubricant to the upper magnetic layer. There is a limit on the amount of a lubricant which can be contained in the ultra-thin magnetic layer. Simple reduction of the thickness of the magnetic layer causes the reduction of the absolute amount of a lubricant, and it follows that running durability is deteriorated. In this case, it was difficult to well balance the thickness of the magnetic layer with the amount of the lubricant. The improvement of electromagnetic characteristics could be compatible with the improvement of durability by imparting different functions to the upper layer and the lower layer and making up for each other. This functional separation was particularly effective in a system where a medium was slid on a magnetic head at a high speed.

In addition to the maintaining function of a lubricant, a controlling function of surface electrical resistance can be imparted to the lower layer. For controlling electrical resistance, in general, a solid electrically conductive material such as a carbon black is added to a magnetic layer in many cases. Such a material not only restricts the increase of the packing density of ferromagnetic powders but also influences the surface roughness of the magnetic layer as the thickness of the magnetic layer becomes thinner. Incorporation of electrically conductive materials in the lower layer can eliminate these defects.

With the progress of multimedia in society, needs for image recording have been increased more and more not only in the industry but also in general homes. The high capacity magnetic recording medium according to the present invention has capabilities capable of sufficiently responding to demands such as function/cost as a medium for recording images, as well as data such as letters and figures. The high capacity magnetic recording medium according to the present invention is based on the coating type magnetic recording medium which has shown actual results and ensures reliability for a long period of time and is excellent in cost performance.

The present invention has been attained for the first time by heaping up the above various factors, and making them worked synergistically and organically.

Magnetic Layer

The lower layer and the ultrathin magnetic layer of the magnetic recording medium according to the present invention may be provided on either one side of the support or may be provided on both sides. The upper magnetic layer may be coated while the lower layer coated is still wet (W/W coating) or may be coated after the lower layer coated is dried (W/D coating). Simultaneous or successive wet on wet coating is preferred in view of the productivity but in the case of a disc-like medium, wet on dry coating can be sufficiently used. In the multilayer construction according to the present invention, as the upper layer and the lower layer can be formed simultaneously or successively (with W/W coating), a surface treatment step, e.g., a calendering step, can be utilized effectively and surface roughness of the upper magnetic layer can be improved even the layer is an ultrathin layer. The coercive force (Hc) of the magnetic layer is essential to be 1,800 Oe or more, and the maximum magnetic flux density (Bm) of ferromagnetic metal powders is preferably from 2,000 to 5,000 G and of barium ferrite powders is from 1,000 to 3,000 G.

Ferromagnetic Metal Powder

The ferromagnetic metal powders which can be used in the upper magnetic layer according to the present invention are preferably ferromagnetic alloy powders containing α-Fe as a main component. These ferromagnetic metal powders may contain, in addition to the prescribed atoms, the following atoms, e.g., Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr and B. In particular, it is preferred to contain at least one of Al, Si, Ca, Y, Ba, La, Nd, Co, Ni and B, in addition to α-Fe, and more preferably at least one of Co, Y and Al in addition to α-Fe. The content of Co is preferably from 0 to 40 atomic %, more preferably from 15 to 35 atomic %, and most preferably from 20 to 35 atomic %, the content of Y is preferably from 1.5 to 12 atomic %, more preferably from 3 to 10 atomic %, and most preferably from 4 to 9 atomic %, and the content of Al is preferably from 1.5 to 12 atomic %, more preferably from 3 to 10 atomic %, and most preferably from 4 to 9 atomic %, each based on Fe. These ferromagnetic metal powders may be previously treated with the later described dispersant, lubricant, surfactant, and antistatic agent before dispersion.

Specific examples thereof are disclosed in JP-B-44-14090, JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-B-39-10307, JP-B-46-39639, U.S. Pat. NOS. 3,026,215, 3,031,341, 3,100,194, 3,242,005, and 3,389,014.

Ferromagnetic metal powders may contain a small amount of a hydroxide or an oxide. Ferromagnetic metal powders can be prepared by well-known methods, such as a method comprising reducing a composite organic acid salt (mainly an oxalate) with a reducing gas, e.g., hydrogen; a method comprising reducing an iron oxide with a reducing gas, e.g., hydrogen, to obtain Fe or Fe—Co particles; a method comprising pyrolysis of a metal carbonyl compound; a method comprising adding to an aqueous solution of a ferromagnetic metal a reducing agent, e.g., sodium boronhydride, hypophosphite, or hydrazine, to conduct reduction; and a method comprising evaporating a metal in a low pressure inert gas to obtain a fine powder. The thus-obtained ferromagnetic metal powders which are subjected to well-known gradual oxidization treatment can be used in the present invention, e.g., a method comprising immersing powders in an organic solvent, then drying; a method comprising immersing powders in an organic solvent, then charging an oxygen-containing gas to form oxide films on the surfaces thereof and drying; and a method comprising forming oxide films on the surfaces of the powders by regulating partial pressure of an oxygen gas and an inert gas without using an organic solvent.

Ferromagnetic metal powders which can be preferably used in the magnetic layer according to the present invention have a specific surface area ($S_{BET}$) as measured by the BET method of from 45 to 80 m$^2$/g, preferably from 50 to 70 m$^2$/g. When $S_{BET}$ is less than 45 m$^2$/g, noise increases and when more than 80 m$^2$/g, good surface property is obtained with difficulty, which is not preferred. Ferromagnetic metal powders which can be preferably used in the magnetic layer according to the present invention have a crystallite size of preferably from 80 to 180 Å, more preferably from 100 to 180 Å, and particularly preferably from 110 to 175 Å. The average long axis length of ferromagnetic metal powders is generally from 0.01 to 0.25 μm, preferably from 0.03 to 0.15 μm, and more preferably from 0.03 to 0.12 μm. Ferromagnetic metal powders preferably have an acicular ratio of from 3 to 15, more preferably from 5 to 12. Ferromagnetic metal powders have a saturation magnetization ($\sigma_s$) of generally from 100 to 180 emu/g, preferably from 110 to 170 emu/g, and more preferably from 125 to 160 emu/g. Ferromagnetic metal powders have a coercive force (Hc) of preferably from 1,700 to 3,500 Oe, and more preferably from 1,800 to 3,000 Oe.

Ferromagnetic metal powders preferably have a water content of from 0.01 to 2%. The water content of ferromagnetic metal powders is preferably optimized by selecting the kinds of binders. The pH of ferromagnetic metal powders is preferably optimized by the combination with the binder to be used. The pH range is from 4 to 12, preferably from 6 to 10. Ferromagnetic metal powders may be surface-treated with Al, Si, P or oxides thereof, if necessary. The amount thereof is from 0.1 to 10% by weight based on the ferromagnetic metal powders. Adsorption of a lubricant, e.g., fatty acid, becomes 100 mg/m$^2$ or less by conducting a surface treatment, which is, therefore, preferred. Soluble inorganic ions (e.g., Na, Ca, Fe, Ni, Sr, etc.) are sometimes contained in ferromagnetic metal powders. It is preferred substantially not to contain such soluble inorganic ions but the properties of ferromagnetic metal powders are not particularly affected if the content is 200 ppm or less. Ferromagnetic metal powders for use in the present invention preferably have less voids and the value thereof is 20% by volume or less, more preferably 5% by volume or less. The shape of ferromagnetic metal powders is not particularly limited, and any shape such as an acicular shape, an ellipsoidal shape or a spindle shape maybe used. Switching Field Distribution (SFD) of a ferromagnetic metal powder itself is preferably small, preferably 0.8 or less. It is necessary to make Hc distribution of ferromagnetic metal powders narrow. When the SFD is 0.8 or less, electromagnetic characteristics are excellent, high output can be obtained, reversal of magnetization becomes sharp and peak shift is less, therefore, suitable for high density digital magnetic recording. For achieving small Hc distribution, making particle size distribution of goethite in ferromagnetic metal powders good and preventing sintering are effective methods.

Ferromagnetic Hexagonal Ferrite Powder

Examples of ferromagnetic hexagonal ferrite which can be preferably used in the magnetic layer according to the present invention include substitution products of barium ferrite, strontium ferrite, lead ferrite and calcium ferrite and Co substitution products. Specifically, magnetoplumbite type barium ferrite and strontium ferrite, magnetoplumbite type ferrite having covered the particle surfaces with spinel, magnetoplumbite type barium ferrite and strontium ferrite partially containing spinel phase, etc., are exemplified. Ferromagnetic hexagonal ferrite powders may contain, in addition to the prescribed atoms, the following atoms, e.g., Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge and Nb. In general, those containing the following elements can be used, e.g., Co—Zn, Co—Ti, Co—Ti—Zr, Co—Ti—Zn, Ni—Ti—Zn, Nb—Zn—Co, Sb—Zn—Co, Nb—Zn, etc. According to starting materials and producing processes, specific impurities may be contained.

The particle size of ferromagnetic hexagonal ferrite powders is the average of the longest hexagonal tabular diameter (hereinafter referred to as "average tabular diameter") and is generally from 10 to 200 nm, preferably from 10 to 100 nm, and particularly preferably from 10 to 80 nm.

When reproduction is conducted using a magneto resistance head, in particular, for increasing track density, it is necessary to reduce noise, accordingly the tabular diameter is preferably 40 nm or less, but if it is smaller than 10 nm, stable magnetization cannot be obtained due to thermal fluctuation. While when it is more than 200 nm, noise increases, therefore, both of such particle diameters are not suitable for high density recording. A tabular ratio (average tabular diameter/average tabular thickness) is preferably from 1 to 15, more preferably from 1 to 7. If a tabular ratio is small, the packing density in a magnetic layer becomes high, which is preferred but satisfactory orientation cannot be obtained. If a tabular ratio is more than 15, noise increases due to stacking among particles. The specific surface area ($S_{BET}$) measured by the BET method of the particles having diameters within this range is generally from 10 to 200 m$^2$/g. Specific surface areas nearly coincide with the values obtained by arithmetic operations from tabular diameters and tabular thicknesses. Distribution of tabular diameter/tabular thickness is generally preferably as narrow as possible. It is difficult to show specific surface area distributions in numerical values but distributions can be compared by measuring TEM photographs of 500 particles selected randomly. Distributions are in many cases not regular distribution, but when expressed by the standard deviation to the average diameter from calculation, σ/average diameter is from 0.1 to 2.0. For obtaining narrow particle size distribution, it is efficient to make a particle forming reaction system homogeneous as far as possible, and particles formed are subjected to distribution—improving treatments as well. For example, a method of selectively dissolving ultrafine particles in an acid solution is also known. Coercive force (Hc) of generally from about 500 to about 5,000 Oe measured in ferromagnetic powders can be produced. Higher Hc is advantageous for high density recording but it is restricted by capacities of recording heads. The ferromagnetic powders according to the present invention have Hc of from about 1,700 to about 4,000 Oe, preferably from 1,800 to 3,500 Oe. When saturation magnetization of the head is more than 1.4 tesla, Hc of 2,000 Oe or more is preferred. Hc can be controlled by particle diameters (tabular diameter/tabular thickness), kinds and amounts of elements contained, substitution sites of elements, and reaction conditions of particle formation. Saturation magnetization ($\sigma_s$) is from 40 to 80 emu/g. $\sigma_s$ is preferably higher but it has inclination of becoming smaller as particles become finer. For the improvement of $\sigma_s$, it is well known to make composite of magnetoplumbite ferrite with spinel ferrite, to select kinds and amounts of elements to be contained, or W type hexagonal ferrite can also be used. Further, when ferromagnetic powders are dispersed, particle surfaces of ferromagnetic powders may be treated with substances compatible with the dispersion media and the polymers. Inorganic or organic compounds are used as a surface treating agent. For example, oxides or hydroxides of Si, Al, P, etc., various kinds of silane coupling agents, and various kinds of titanium coupling agents are representative examples. The amount of these surface treating agents is from 0.1 to 10% by weight based on the amount of the ferromagnetic powder. The pH of ferromagnetic powders is also important for dispersion, and is in general from 4 to 12. The optimal value is dependent upon the dispersion medium and the polymer. Taking chemical stability and storage stability of magnetic media into consideration, pH of from 6 to 11 or so is selected. The water content in the ferromagnetic powder also affects dispersion. The optimal value is dependent upon the dispersion medium and the polymer, and the water content of from 0.01 to 2.0% by weight based on the ferromagnetic powder is selected in general. Producing methods of hexagonal ferrite include the following and any of these methods can be used in the present invention: (1) a glass crystallization method in which metal oxides which substitute barium oxide, iron oxide and iron, and boron oxide, etc., as a glass forming material are mixed so as to make a desired ferrite composition, melted, and then quenched to obtain an amorphous product, the obtained product is reheat-treated, washed and then pulverized to obtain a barium ferrite crystal powder, (2) a hydrothermal reaction method in which a solution of barium ferrite composition metal salts is neutralized with an alkali, byproducts are removed followed by liquid phase heating at 100° C. or more, washed, dried and then pulverized to obtain a barium ferrite crystal powder, and (3) a coprecipitation method in which a solution of barium ferrite composition metal salts is neutralized with an alkali, byproducts are removed followed by drying, treated at 1,100° C. or less, and then pulverized to obtain a barium ferrite crystal powder.

Nonmagnetic Layer

The lower layer is described in detail below. Inorganic powders contained in the lower layer of the present invention are nonmagnetic powders. They can be selected from the following inorganic compounds such as metal oxide, metal carbonate, metal sulfate, metal nitride, metal carbide, metal sulfide, etc. Examples of inorganic compounds are selected from the following compounds and they can be used alone or in combination, e.g., α-alumina having an alpha-conversion rate of 90% or more, β-alumina, γ-alumina, Θ-alumina, silicon carbide, chromium oxide, cerium oxide, α-iron oxide, hematite, goethite, corundum, silicon nitride, titanium carbide, titanium oxide, silicon dioxide, stannic oxide, magnesium oxide, tungsten oxide, zirconium oxide, boron nitride, zinc oxide, calcium carbonate, calcium sulfate, barium sulfate, and molybdenum disulfide. Of these compounds, particularly preferred are titanium dioxide, zinc oxide, iron oxide and barium sulfate because they have small particle size distribution and various means for imparting functions, and more preferred are titanium dioxide and α-iron oxide. These inorganic powders preferably have an average particle size of from 0. 005 to 2 μm. If desired, a plurality of inorganic powders each having a different average particle size may be combined, or a single inorganic powder having a broad particle size distribution may be employed so as to attain the same effect as such a combination. A particularly preferred particle size of inorganic powders is from 0.01 to 0.2 μm. In particular, when the inorganic powder is a granular metal oxide, the average particle size thereof is preferably 0.08 μm or less, and when it is an acicular metal oxide, the average long axis length thereof is preferably 0.3 μm or less, more preferably 0.2 μm or less. Inorganic powders for use in the present invention have a tap density of from 0.05 to 2 g/ml, preferably from 0.2 to 1.5 g/ml; a water content of from 0.1 to 5% by weight, preferably from 0.2 to 3% by weight, and more preferably from 0.3 to 1.5% by weight; a pH value of generally from 2 to 11, particularly preferably between 5.5 and 10; a specific surface area ($S_{BET}$) of generally from 1 to 100 m$^2$/g, preferably from 5 to 80 m$^2$/g, and more preferably from 10 to 70 m$^2$/g; a crystallite size of preferably from 0.004 to 1 μm, and more preferably from 0.04 to 0.1 μm; an oil absorption amount using DBP (dibutyl phthalate) of generally from 5 to 100 ml/100 g, preferably from 10 to 80 ml/100 g, and more preferably from 20 to 60 ml/100 g; and a specific gravity of generally from 1 to 12, preferably from 3 to 6. The shape of inorganic powders may be any of acicular, spherical, polyhedral, or tabular shape. Inorganic powders preferably have a Mohs' hardness of from 4 to 10. The SA (stearic acid) absorption amount of inorganic powders is from 1 to 20 μmol/m$^2$, preferably from 2 to 15 μmol/m$^2$, and more preferably from 3 to 8 μmol/m$^2$. The pH thereof is preferably between 3 and 6. The surfaces of these inorganic powders are preferably covered with Al$_2$O$_3$, SiO$_2$, TiO$_2$, ZrO$_2$, SnO$_2$, Sb$_2$O$_3$, ZnO or Y$_2$O$_3$ by surface treatment. Preferred in the point of dispersibility are Al$_2$O$_3$, SiO$_2$, TiO$_2$ and ZrO$_2$, and more preferred are Al$_2$O$_3$, SiO$_2$ and ZrO$_2$. They can be used in combination or alone. A method in which the surface treatment may be performed by coprecipitation, alternatively, surface treatment of particles may be previously performed to be covered with alumina in the first place, then the alumina-covered surface is covered with silica, or vice versa, according to purposes. The surface-covering layer may be porous layer, if necessary, but a homogeneous and dense surface is generally preferred.

Specific examples of inorganic powders for use in the lower layer according to the present invention include Nanotite (manufactured by Showa Denko Co., Ltd.), HIT-100 and ZA-G1 (manufactured by Sumitomo Chemical Co., Ltd.), α-hematite DPN-250, DPN-250BX, DPN-245, DPN-270BX, DPN-500BX, DBN-SA1, and DBN-SA3 (manufactured by Toda Kogyo Co., Ltd.), titanium oxide TTO-51B, TTO-55A, TTO-55B, TTO-55C, TTO-55S, TTO-55D, SN-100, α-hematite E270, E271, E300, and E303 (manufactured by Ishihara Sangyo Kaisha Ltd.), titanium oxide STT-4D, STT-30D, STT-30, STT-65C, and α-hematite α-40 (manufactured by Titan Kogyo Co., Ltd.), MT-100S, MT-100T, MT-150W, MT-500B, MT-600B, MT-100F, and MT-500HD (manufactured by Teika Co., Ltd.), FINEX-25, BF-1, BF-10, BF-20, and ST-M (manufactured by Sakai Chemical IndustryCo., Ltd.), DEFIC-Y and DEFIC-R (manufactured by Dowa Mining Co., Ltd.), AS2BM and $TiO_2$ P25 (manufactured by Nippon Aerosil Co., Ltd.), and 100A, 500A and calcined products thereof (manufactured by Ube Industries, Ltd.) . Particularly preferred inorganic powders are titanium dioxide and α-iron oxide.

By the incorporation of carbon blacks into the lower layer, a desired micro Vickers' hardness can be obtained in addition to the well-known effects of reducing surface electrical resistance (Rs) and light transmittance. Further, it is also possible to obtain the effect of stocking a lubricant by the incorporation of carbon blacks into the lower layer. Furnace blacks for rubbers, thermal blacks for rubbers, carbon blacks for coloring, acetylene blacks, etc. can be used therefor. Carbon blacks used in the lower layer should optimize the following characteristics by the desired effects and sometimes more effects can be obtained by the combined use.

Carbon blacks for use in the lower layer according to the present invention have a specific surface area ($S_{BET}$) of generally from 100 to 500 m$^2$/g, preferably from 150 to 400 m$^2$/g, a DBP oil absorption of generally from 20 to 400 ml/100 g, preferably from 30 to 400 ml/100 g, an average particle size of generally from 5 to 80 nm, preferably from 10 to SO nm, and more preferably from 10 to 40 nm, pH of generally from 2 to 10, a water content of from 0.1 to 10% by weight, and a tap density of from 0.1 to 1 g/ml. Specific examples of carbon blacks for use in the lower layer according to the present invention include BLACK-PEARLES 2000, 1300, 1000, 900, 800, 880 and 700, and VULCAN XC-72 (manufactured by Cabot Co., Ltd.), #3050B, #3150B, #3250B, #3750B, #3950B, #950, #650B, #970B, #850B, MA-600, MA-230, #4000 and #4010 (manufactured by Mitsubishi Kasei Corp.), CONDUCTEX SC, RAVEN 8800, 8000, 7000, 5750, 5250, 3500, 2100, 2000, 1800, 1500, 1255 and 1250 (manufactured by Columbia Carbon Co., Ltd.), and Ketjen Black EC (manufactured by Akzo Co., Ltd.). Carbon blacks for use in the present invention may previously be surface-treated with a dispersant, may be grafted with a resin, or a part of the surface thereof may be graphitized before use. The carbon black may be previously dispersed in a binder before addition to the coating solution. Carbon blacks can be used within the range not exceeding 50% by weight based on the above inorganic powders and not exceeding 40% by weight based on the total weight of the nonmagnetic layer. These carbon blacks can be used alone or in combination. Regarding carbon blacks for use in the present invention, for example, the disclosure in *Handbook of Carbon Blacks* (edited by Carbon Black Association of Japan) can be referred to.

Organic powders can be used in the lower layer according to the purpose. Examples of such organic powders include an acryl styrene resin powder, a benzoguanamine resin powder, a melamine resin powder, and a phthalocyanine pigment. In addition, at least one of a polyolefin resin powder, a polyester resin powder, a polyamide resin powder, a polyimide resin powder, and a polyethylene fluoride resin powder can also be used. The producing methods thereof are disclosed in JP-A-62-18564 and JP-A-60-255827.

Binder

Binder resins, lubricants, dispersants, additives, solvents, dispersing methods, etc., used for the magnetic layer described below can be used in the lower layer. In particular, with respect to the amounts and the kinds of binder resins, and the amounts and the kinds of additives and dispersants, well-known prior art techniques regarding the magnetic layer can be applied to the lower layer according to the present invention.

Conventionally well-known thermoplastic resins, thermosetting resins, reactive resins and mixtures of these resins are used as a binder in the present invention. Thermoplastic resins having a glass transition temperature of from −100 to 150° C., a number average molecular weight of from 1,000 to 200,000, preferably from 10,000 to 100,000, and a polymerization degree of from about 50 to 1,000 can be used in the present invention.

Examples thereof include polymers or copolymers containing as a constituting unit the following compounds, such as vinyl chloride, vinyl acetate, vinyl alcohol, maleic acid, acrylic acid, acrylate, vinylidene chloride, acrylonitrile, methacrylic acid, methacrylate, styrene, butadiene, ethylene, vinyl butyral, vinyl acetal and vinyl ether; polyurethane resins and various rubber resins. Examples of thermosetting resins and reactive resins usable in the present invention include phenol resins, epoxy resins, curable type polyurethane resins, urea resins, melamine resins, alkyd resins, acrylic reactive resins, formaldehyde resins, silicone resins, epoxy-polyamide resins, mixtures of polyester resins and isocyanate prepolymers, mixtures of polyesterpolyol and polyisocyanate, and mixtures of polyurethane and polyisocyanate. Details on these resins are described in *Plastic Handbook,* published by Asakura Shoten. It is also possible to use well-known electron beam curable type resins in each layer. Examples of these resins and producing methods are disclosed in detail in JP-A-62-256219. These resins can be used alone or in combination. Examples of preferred combinations include at least one selected from vinyl chloride resins, vinyl chloride-vinyl acetate copolymers, vinyl chloride-vinyl acetate-vinyl alcohol copolymers, and vinyl chloride-vinyl acetate-maleic anhydride copolymers with polyurethane resins, or combinations of these resins with polyisocyanate.

As polyurethane resins, those having well-known structures can be used, e.g., polyester polyurethane, polyether polyurethane, polyether polyester polyurethane, polycarbonate polyurethane, polyester polycarbonate polyurethane, polycaprolactone polyurethane, etc. Preferably, at least one polar group selected from the following groups is introduced into the above binders by copolymerization or addition reaction for the purpose of further improving the dispersibility and the durability, e.g., —COOM, —SO$_3$M, —OSO$_3$M, —P=O(OM)$_2$, —O—P=O(OM)$_2$ (wherein M represents a hydrogen atom, or an alkali metal salt group), —OH, —NR$_2$, —N$^+$R$_3$ (R represents a hydrocarbon group), an epoxy group, —SH, or —CN. The content of the polar group is from $10^{-1}$ to $10^{-8}$ mol/g, preferably from $10^{-2}$ to $10^{-6}$ mol/g.

Specific examples of binders for use in the present invention include VAGH, VYHH, VMCH, VAGF, VAGD, VROH, VYES, VYNC, VMCC, XYHL, XYSG, PKHH, PKHJ, PKHC and PKFE (manufactured by Union Carbide Co., Ltd.), MPR-TA, MPR-TA5, MPR-TAL, MPR-TSN, MPR-TMF, MPR-TS, MPR-TM and MPR-TAO (manufactured by Nisshin Chemical IndustryCo., Ltd.), 1000W, DX80, DX81, DX82, DX83 and 100FD (manufactured by Electro Chemical Industry Co., Ltd.), MR-104, MR-105, MR-110, MR-100, MR-555 and 400X-110A (manufactured by Nippon Zeon Co., Ltd.), Nippollan N2301, N2302 and N2304 (manufactured by Nippon Polyurethane Co., Ltd.), Pandex T-5105, T-R3080 and T-5201, Burnock D-400, D-210-80, Crisvon 6109 and 7209 (manufactured by Dainippon Chemicals and Ink.), Vylon UR8200, UR8300, UR8700, RV530 and RV280 (manufactured by Toyobo Co., Ltd.), Daipheramine 4020, 5020, 5100, 5300, 9020, 9022 and 7020 (manufactured by Dainichi Seika K.K.), MX5004 (manufactured by Mitsubishi Kasei Corp.), Sunprene SP-150 (manufactured by Sanyo Chemical Industries Co. Ltd.), Salan F310 and F210 (manufactured by Asahi Chemical Industry Co., Ltd.), etc.

The amount of the binder for use in the nonmagnetic layer and the magnetic layer according to the present invention is from 5 to 50% by weight, preferably from 10 to 30% by weight, based on the weight of the nonmagnetic powder in the nonmagnetic layer and on the weight of the magnetic powder in the magnetic layer, respectively. When vinyl chloride resins are used, the amount thereof is from 5 to 30% by weight, when polyurethane resins are used, the amount of the polyurethane resin is from 2 to 20% by weight, and it is preferred polyisocyanate is used in an amount of from 2 to 20% by weight in combination with these resins. However, for instance, when head corrosion is caused by a slight amount of chlorine due to dechlorination, it is possible to use polyurethane alone or a combination of polyurethane and isocyanate alone. When polyurethane is used in the present invention, the polyurethane has a glass transition temperature of from −50 to 150° C., preferably from 0 to 100° C., breaking extension of from 100 to 2,000%, breaking stress of from 0.05 to 10 kg/mm$^2$, and a yielding point of from 0.05 to 10 kg/mm$^2$.

The magnetic recording medium according to the present invention may comprise two or more layers. Accordingly, the amount of the binder, the amounts of vinyl chloride resins, polyurethane resins, polyisocyanate or other resins contained in the binder, the molecular weight of each resin constituting the magnetic layer, the amount of polar groups, or the above-described physical properties of resins can of course be varied in the nonmagnetic layer and the magnetic layer, according to necessity. These factors should be rather optimized in respective layers. Well-known techniques with respect to multilayer magnetic layers can be used in the present invention. For example, when the amount of the binder is varied in each layer, it is effective to increase the amount of the binder contained in the magnetic layer to reduce scratches on the surface of the magnetic layer. For improving the head touch against the head, it is effective to increase the amount of the binder in the nonmagnetic layer to impart flexibility.

Examples of the polyisocyanates which can be used in the present invention include isocyanates, e.g., tolylenediisocyanate, 4,4'-diphenylmethanediisocyanate, hexamethylenediisocyanate, xylylenediisocyanate, naphthylene-1,5-diisocyanate, o-toluidinediisocyanate, isophoronediisocyanate, and triphenylmethanetriisocyanate; reaction products of these isocyanates with polyalcohols; and polyisocyanates formed by condensation reaction of isocyanates. These polyisocyanates are commercially available under the trade names of Coronate L, Coronate HL, Coronate 2030, Coronate 2031, Millionate MR and Millionate MTL (manufactured by Nippon Polyurethane Co., Ltd.), Takenate D-102, Takenate D-110N, Takenate D-200 and Takenate D-202 (manufactured by Takeda Chemical Industries, Ltd.), and Desmodur L, Desmodur IL, Desmodur N and Desmodur HL (manufactured by Sumitomo Bayer Co., Ltd.). These polyisocyanates may be used alone or in combinations of two or more thereof, taking advantage of a difference in curing reactivity in each layer.

Carbon Black, Abrasive

Examples of carbon blacks for use in the magnetic layer according to the present invention include furnace blacks for rubbers, thermal blacks for rubbers, carbon blacks for coloring, acetylene blacks, etc. Carbon blacks for use in the magnetic layer of the present invention preferably have a specific surface area ($S_{BET}$) of from 5 to 500 m$^2$/g, a DBP oil absorption of from 10 to 400 ml/100 g, an average particle size of from 5 to 300 nm, pH of from 2 to 10, a water content of from 0.1 to 10% by weight, and a tap density of from 0.1 to 1 g/ml. Specific examples of carbon blacks for use in the magnetic layer of the present invention include BLACK-PEARLES 2000, 1300, 1000, 900, 905, 800, and 700, and VULCAN XC-72 (manufactured by Cabot Co., Ltd.), #80, #60, #55, #50, and #35 (manufactured by Asahi Carbon Co., Ltd.), #2400B, #2300, #900, #1000, #30, #40and #10B (manufactured by Mitsubishi Kasei Corp.), CONDUCTEX SC, RAVEN 150, 50, 40, and 15, and RAVEN-MT-P (manufactured by Columbia Carbon Co., Ltd.), and Ketjen Black EC (manufactured by Akzo Co., Ltd.). Carbon blacks for use in the present invention may previously be surface-treated with a dispersant, may be grafted with a resin, or a part of the surface thereof may be graphitized before use. Carbon blacks may be previously dispersed in a binder before addition to the magnetic coating solution. These carbon blacks may be used alone or in combination. Carbon blacks are preferably used in an amount of from 0.1 to 30% by weight based on the amount of the ferromagnetic powder. Carbon blacks can serve various functions such as preventing static charges of the magnetic layer, reducing a friction coefficient, imparting a light-shielding property and improving a film strength. Such functions vary depending upon the kind of carbon blacks to be used. Accordingly, it is of course possible in the present invention to select and determine the kinds, the amounts and the combinations of the carbon blacks to be added to the magnetic layer and the lower layer, on the basis of the above mentioned various properties such as the particle size, the oil absorption amount, the electro-conductivity and the pH value, or these should be rather optimized in respective layers. Regarding carbon blacks for use in the magnetic layer of the present invention, for example, the disclosure in *Handbook of Carbon Blacks* (edited by Carbon Black Association of Japan) can be referred to.

As the abrasive usable in the present invention, well-known materials essentially having a Mohs' hardness of 6 or more may be used alone or in combination. Examples of such abrasives include α-alumina having an alpha-conversion rate of 90% or more, β-alumina, silicon carbide, chromium oxide, cerium oxide, α-iron oxide, corundum, artificial diamond, silicon nitride, silicon carbide, titanium carbide, titanium oxide, silicon dioxide, and boron nitride. Composites composed of these abrasives (abrasives obtained by surface-treating with other abrasives) may also be used. Compounds or elements other than the main component are often contained in these abrasives, but the intended effect can be attained so far as the content of the main component is 90 wt % or more. Abrasives preferably have a particle size of from 0.01 to 2 μm and, in particular, for improving electromagnetic characteristics, abrasives having narrow particle size distribution are preferred. For improving durability, a plurality of abrasives each having a different particle size may be combined according to necessity, or a single abrasive having a broad particle size distribution may be employed so as to attain the same effect as such a combination. Preferably, abrasives for use in the present invention have a tap density of from 0.3 to 2 g/ml, a water content of from 0.1 to 5% by weight, a pH value of from 2 to 11 and a specific surface area ($S_{BET}$) of from 1 to 30 m$^2$/g. The shape of the abrasives to be used in the present invention may be any of acicular, spherical and die-like shapes. Preferably, the abrasive has a shape partly with edges, because a high abrasive property is given. Specific examples of abrasives for use in the present invention include AKP-12, AKP-15, AKP-20, AKP-30, AKP-50, HIT-20, HIT-30, HIT-55, HIT-60, HIT-70, HIT-80, and HIT-100 (manufactured by Sumitomo Chemical Co., Ltd.), ERC-DBM, HP-DBM, and HPS-DBM (manufactured by Reynolds International Inc.), WA10000 (manufactured by Fujimi Kenma K.K.), UB20 (manufactured by Uemura Kogyo K.K.), G-5, Kromex U2, and Kromex U1 (manufactured by Nippon Chemical Industrial Co., Ltd.), TF100 and TF140 (manufactured by Toda Kogyo Co., Ltd.), β-Random Ultrafine (manufactured by Ibiden Co., Ltd.), and B-3 (manufactured by Showa Mining Co., Ltd.). These abrasives may also be added to a nonmagnetic layer, if necessary. By incorporating abrasives into a nonmagnetic layer, it is possible to control the surface shape or prevent abrasives from protruding. Particle sizes and amounts of abrasives to be added to a magnetic layer and a nonmagnetic layer should be selected independently at optimal values.

Additive

As additives which can be used in the magnetic layer and the nonmagnetic layer of the present invention, those having a lubrication effect, an antistatic effect, a dispersing effect and a plasticizing effect maybe used. Examples thereof include molybdenum disulfide, tungsten disulfide, graphite, boron nitride, graphite fluoride, silicone oil, polar group-containing silicons, fatty acid-modified silicons, fluorine-containing silicons, fluorine-containing alcohols, fluorine-containing esters, polyolefins, polyglycols, alkyl phosphates and alkali metal salts thereof, alkyl sulfates and alkali metal salts thereof, polyphenyl ethers, phenylphosphonic acids, α-naphthylphosphoric acids, phenylphosphoric acids, diphenylphosphoric acids, p-ethyl-benzenephosphonic acids, phenylphosphinic acids, amino-quinones, various kinds of silane coupling agents, titanium coupling agents, fluorine-containing alkyl sulfates and alkali metal salts thereof, monobasic fatty acids having from 10 to 24 carbon atoms (which may contain an unsaturated bond or which may be branched) and metal salts thereof (e.g., with Li, Na, K or Cu), mono-, di-, tri-, tetra-, penta- or hexa-alcohols having from 12 to 22 carbon atoms (which may contain an unsaturated bond or may be branched), alkoxy alcohols having from 12 to 22 carbon atoms (which may contain an unsaturated bond or may be branched), mono-fatty acid esters, di-fatty acid esters or tri-fatty acid esters composed of a monobasic fatty acid having from 10 to 24 carbon atoms (which may contain an unsaturated bond or may be branched) and any one of mono-, di-, tri-, tetra-, penta- and hexa-alcohols having from 2 to 12 carbon atoms (which may contain an unsaturated bond or may be branched), fatty acid esters of monoalkyl ethers of alkylene oxide polymers, fatty acid amides having from 8 to 22 carbon atoms, and aliphatic amines having from 8 to 22 carbon atoms.

Specific examples of fatty acids for such additives include capric acid, caprylic acid, lauric acid, myristic acid, palmitic acid, stearic acid, behenic acid, oleic acid, elaidic acid, linolic acid, linolenic acid, and isostearic acid. Examples of esters include butyl stearate, octyl stearate, amyl stearate, isooctyl stearate, butyl myristate, octyl myristate, butoxyethyl stearate, butoxydiethyl stearate, 2-ethylhexyl stearate, 2-octyldodecyl palmitate, 2-hexyldodecyl palmitate, isohexadecyl stearate, oleyl oleate, dodecyl stearate, tridecyl stearate, oleyl erucate, neopentyl glycol didecanoate, and ethylene glycol dioleate, and examples of alcohols for the additives include oleyl alcohol, stearyl alcohol and lauryl alcohol. Additionally, examples of other additives which may be used include nonionic surfactants such as alkylene oxides, glycerols, glycidols or alkylphenol-ethylene oxide adducts; cationic surfactants such as cyclic amines, ester amides, quaternary ammonium salts, hydantoin derivatives, heterocyclic compounds, phosphoniums or sulfoniums; anionic surfactants containing an acidic group such as carboxylic acid, sulfonic acid, phosphoric acid, sulfate groups or phosphate groups; and amphoteric surfactants such as amino acids, aminosulfonic acids, sulfates or phosphates of amino alcohols or alkylbetains. The details of these surfactants are described in *Handbook of Surfactants* (published by Sangyo Tosho Co., Ltd.). These lubricants and antistatic agents may not always be 100% pure and may contain impurities such as isomers, non-reacted materials, byproducts, decomposed products and oxides, in addition to the main component. However, the content of such impurities is preferably 30% or less, more preferably 10% or less.

Lubricants and surfactants for use in the present invention respectively have different physical functions. The kinds, amounts and proportions of combination generating synergistic effect of these lubricants should be determined optimally in accordance with the purpose. The nonmagnetic layer and the magnetic layer can separately contain different fatty acids each having a different melting point so as to control bleeding out of the fatty acids to the surface, or different esters each having a different boiling point, a different melting point or a different polarity so as to control bleeding out of the esters to the surface. Also, the amounts of surfactants are controlled so as to improve the coating stability, or the amount of the lubricant in the lower layer is made larger so as to improve the lubricating effect of the surface thereof. Examples are by no means limited thereto. In general, the total amount of the lubricants is from 0.1 to 50% by weight, preferably from 2 to 25% by weight, based on the weight of the ferromagnetic powder or the nonmagnetic powder.

All or a part of the additives to be used in the present invention may be added to the magnetic coating solution or the nonmagnetic coating solution in any step of the preparation. For example, additives may be blended with a ferromagnetic powder before the kneading step, may be added during the step of kneading a ferromagnetic powder, a binder and a solvent, may be added during the dispersing step, may be added after the dispersing step, or may be added immediately before coating. According to the purpose, there is a case of capable of attaining the object by coating all or a part of the additives simultaneously with or successively after the coating of the magnetic layer. According to the. purpose, lubricants may be coated on the surface of the magnetic layer after the calendering treatment or after the completion of slitting.

Well-known organic solvents can be used in the present invention, for example, organic solvents disclosed in JP-6-68453 can be used.

Layer Construction

The thickness of the support in the magnetic recording medium of the present invention is, for example, from2 to 100 μm, preferably from 2 to 80 μm. Particularly, the thickness of the support of a computer tape is from 3.0 to 6.5 μm, preferably from 3.0 to 6.0 μm, more preferably from 4.0 to 5.5 μm. The thickness of the support of a disc-like medium is generally from 20 to 100 μm, preferably from 30 to 80 μm.

An undercoating layer (or a subbing layer) may be provided between the support and the nonmagnetic layer for adhesion improvement. The thickness of this undercoating layer is from 0.01 to 0.5 μm, preferably from 0.02 to 0.5 μm. The magnetic recording medium according to the present invention may be a disc-like medium comprising the nonmagnetic layer and the magnetic layer provided on both surface sides of the support or may be a disc-like or tape-like medium in which the nonmagnetic layer and the magnetic layer are provided on either one surface side. When the nonmagnetic layer and the magnetic layer are provided on only one surface side of the support, a back coating layer may be provided on the surface side of the support opposite to the side having the nonmagnetic layer and magnetic layer for the purpose of static charge prevention and curling correction. The thickness of this back coating layer is from 0.1 to 4 μm, preferably from 0.3 to 2.0 μm. Well-known undercoating layers and back coating layers can be used for this purpose.

The thickness of the magnetic layer of the magnetic recording medium of the present invention can be optimally selected according to the saturation magnetization amount of the head used, the head gap length, and the recording signal zone. The magnetic layer may comprise two or more layers each having different magnetic characteristics and well-known multilayer magnetic layer structures can be applied to the present invention. In that case, the dry thickness indicates the total thickness of such magnetic layers.

The thickness of the lower nonmagnetic layer of the magnetic recording medium according to the present invention is generally from 0.2 to 5.0 μm, preferably from 0.3 to 3.0 μm, and more preferably from 1.0 to 2.5 μm. The lower nonmagnetic layer of the recording medium of the present invention exhibits the effect of the present invention so long as it is substantially a nonmagnetic layer even if, or intendedly, it contains a small amount of a magnetic powder as an impurity, which is as a matter of course regarded as essentially the same construction as in the present invention. The term "substantially a nonmagnetic layer" means that the residual magnetic flux density of the lower nonmagnetic layer is 100 G or less and the coercive force of the nonmagnetic layer is 100 Oe or less, preferably the residual magnetic flux density and the coercive force are zero.

Back Coating Layer

It is preferred for the back coating layer to contain a carbon black and an inorganic powder.

Two kinds of carbon blacks respectively having different average particle sizes are preferably used in combination. In this case, a combined use of a fine carbon black having an average particle size of from 10 to 20 nm and a coarse carbon black having an average particle size of from 230 to 300 nm is preferred. In general, by the incorporation of a fine carbon black as above, the surface electrical resistance of the back coating layer and light transmittance can be set up at low values. There are many kinds of magnetic recording apparatuses making use of light transmittance of a tape and making it as signals of operation, therefore, the addition of fine carbon blacks are particularly effective in such a case. In addition, a fine carbon black is in general excellent in retention of a liquid lubricant and contributes to the reduction of a friction coefficient when a lubricant is used in combination. On the other hand, a coarse carbon black having an average particle size of from 230 to 300 nm has a function as a solid lubricant and forms minute protrusions on the surface of a back coating layer to reduce the contact area and contributes to the reduction of a friction coefficient. However, a coarse carbon black has a drawback such that particles are liable to drop out from the back coating layer due to the tape sliding during severe running leading to the increase of the error rate.

Specific examples of fine carbon blacks commercially available include RAVEN 2000B (average particle size: 18 nm) and RAVEN 1500B (average particle size: 17 nm) (manufactured by Columbia Carbon Co., Ltd.), BP800 (average particle size: 17 nm) (manufactured by Cabot Co., Ltd.), PRINTEX90 (average particle size: 14 nm), PRINTEX95 (average particle size: 15 nm), PRINTEX85 (average particle size: 16 nm), PRINTEX75 (average particle size: 17 nm) (manufactured by Degussa Co., Ltd.), and #3950 (average particle size: 16 nm) (manufactured by Mitsubishi Kasei Corp.).

Specific examples of coarse carbon blacks commercially available include THERMAL BLACK (average particle size: 270 nm) (manufactured by Cancarb Co., Ltd.) and RAVEN MTP (average particle size: 275 nm) (manufactured by Columbia Carbon Co., Ltd.).

When two kinds of carbon blacks respectively having different average particle sizes are used in combination in a back coating layer, the proportion of the contents (by weight) of a fine carbon black having a particle size of from 10 to 20 nm and a coarse carbon black having a particle size of from 230 to 300 nm is preferably the former/the latter of from 98/2 to 75/25, more preferably from 95/5 to 85/15.

The content of the carbon black in a back coating layer (the total amount when two kinds are used) is generally from 30 to 80 weight parts, preferably from 45 to 65 weight parts, based on 100 weight parts of the binder.

It is preferred to use two kinds of inorganic powders respectively having different hardness.

Specifically, a soft inorganic powder having a Mohs' hardness of from 3 to 4.5 and a hard inorganic powder having a Mohs' hardness of from 5 to 9 are preferably used in combination.

By the addition of a soft inorganic powder having a Mohs' hardness of from 3 to 4.5, a friction coefficient can be stabilized against repeating-running. Moreover, a sliding guide pole is not scratched off in hardness within this range. The average particle size of such a soft inorganic powder is preferably from 30 to 50 nm.

Examples of soft inorganic powders having a Mohs' hardness of from 3 to 4.5 include, e.g., calcium sulfate, calcium carbonate, calcium silicate, barium sulfate, magnesium carbonate, zinc carbonate and zinc oxide. They can be used alone or in combination of two or more. Of these, calcium carbonate is particularly preferred.

The content of the soft inorganic powder in a back coating layer is preferably from 10 to 140 weight parts, more preferably from 35 to 100 weight parts, based on 100 weight parts of the carbon black.

By the addition of a hard inorganic powder having a Mohs' hardness of from 5 to 9, the strength of the back coating layer is increased and running durability is improved. When such hard inorganic powders are used together with carbon blacks and the above-described soft inorganic powders, deterioration due to repeating sliding is reduced and strong back coating layer can be obtained. Appropriate abrasive capability is imparted to the back coating layer by the addition of the hard inorganic powder and the adhesion of scratched powders to a tape guide pole is reduced. In particular, when the hard inorganic powder is used in combination with a soft inorganic powder (in particular, calcium carbonate), sliding characteristics against a guide pole having a rough surface is improved and the stabilization of a friction coefficient of the back coating layer can also be brought about.

The average particle size of hard inorganic powders is preferably from 80 to 250 nm, more preferably from 100 to 210 nm.

Examples of hard inorganic powders having a Mohs' hardness of from 5 to 9 include, e.g., $\alpha$-iron oxide, $\alpha$-alumina, and chromium oxide ($Cr_2O_3$). These powders may be used alone or in combination. Of the above, $\alpha$-iron oxide and $\alpha$-alumina are preferred.

The content of hard inorganic powders in the back coating layer is generally from 3 to 30 weight parts, preferably from 3 to 20 weight parts, based on 100 weight parts of the carbon black.

When the above soft inorganic powder and hard inorganic powder are used in combination in the back coating layer, it is preferred to use them selectively such that the difference of hardness between soft and hard inorganic powders is 2 or more, more preferably 2.5 or more, and particularly preferably 3 or more.

It is preferred that the above-described two kinds of inorganic powders respectively having different hardness and specific average particle sizes and the above-described two kinds of carbon blacks respectively having different specific average particle sizes are contained in the back coating layer. In particular, in this combination, calcium carbonate is preferably contained as a soft inorganic powder.

Lubricants may be contained in the back coating layer. Lubricants can be arbitrarily selected from among those which can be used in a magnetic layer or a nonmagnetic layer as described above. The content of lubricants added to the back coating layer is generally from 1 to 5 weight parts based on 100 weight parts of the binder.

Producing Method

Processes of preparing the magnetic coating solution and a nonmagnetic coating solution for use in the magnetic recording medium of the present invention comprise at least a kneading step, a dispersing step and, optionally, blending steps to be carried out before and/or after the kneading and dispersing steps. Any of these respective steps may be composed of two or more separate stages. Materials such as a magnetic powder, a nonmagnetic powder, a binder, a carbon black, an abrasive, an antistatic agent, a lubricant, a solvent, and the like for use in the present invention may be added at any step at any time. Each material may be added at two or more steps dividedly. For example, polyurethane can be added dividedly at a kneading step, a dispersing step, or a blending step for adjusting viscosity after dispersion. For producing the magnetic recording medium according to the present invention, the above steps can be performed partly with conventionally well-known techniques. Powerful kneading machines such as an open kneader, a continuous kneader, a pressure kneader or an extruder are preferably used in a kneading step. When a kneader is used, all or a part of the binder (preferably 30% or more of the total binders) are kneading-treated in the range of from 15 parts to 500 parts per 100 parts of the magnetic powder or nonmagnetic powder together with a magnetic powder or a nonmagnetic powder. Details of this kneading are disclosed in JP-A-1-106338 and JP-A-1-79274. When dispersing a magnetic layer solution and a nonmagnetic layer solution, glass beads can be used but dispersing media having a high specific gravity is preferably used and zirconia beads, titania beads and steel beads are suitable for this purpose. Optimal particle size and packing density of these dispersing media should be selected. Well-known dispersing apparatuses can be used in the present invention.

The following methods are preferably used for coating the magnetic recording medium having a multilayer construction of the present invention. As the first method, the lower layer is coated by any of gravure coating, roll coating, blade coating, and extrusion coating apparatuses, which are ordinarily used in the coating of a magnetic coating solution, and the upper layer is coated while the lower layer is still wet by means of the support pressing type extrusion coating apparatus disclosed in JP-B-1-46186, JP-A-60-238179 and JP-A-2-265672. As the second method, the upper layer and the lower layer are coated almost simultaneously using the coating head equipped with two slits for feeding coating solution as disclosed in JP-A-63-88080, JP-A-2-17971 and JP-A-2-265672. And as the third method, the upper layer and the lower layer are coated almost simultaneously using the extrusion coating apparatus equipped with a backup roll as disclosed in JP-A-2-174965. For preventing the deterioration of the electromagnetic characteristics of the magnetic recording medium due to agglomeration of magnetic powders, it is preferred to impart shear to the coating solution in the coating head by the methods as described in JP-A-62-95174 and JP-A-1-236968. With respect to the viscosity of the coating solution, the range of the numeric values disclosed in JP-A-3-8471 is necessary to be satisfied. For realizing the constitution of the present invention, successive multilayer coating method in which the magnetic layer is coated on the lower layer after the lower layer has been coated and dried can of course be used without impairing the effect of the present invention. However, for reducing coating defects and improving quality, e.g., dropout, it is preferred to use the above simultaneous multilayer coating method.

In the case of a magnetic disc, isotropic orienting property can be sufficiently obtained in some cases without conducting orientation using orientating apparatus, but it is preferred to use well-known random orientation apparatuses, such as disposing cobalt magnets diagonally and alternately or applying an alternating current magnetic field using a solenoid. Isotropic orientation in a ferromagnetic metal fine powder is in general preferably in-plane two dimensional random orientation, but it may be three dimensional random orientation having vertical components. Hexagonal ferrites in general have an inclination for three dimensional random orientation of in-plane and in the vertical direction but it can be made in-plane two dimensional random orientation. Further, it is possible to impart isotropic magnetic characteristics in the circumferential direction by vertical orientation using well-known methods, e.g., using different pole and counter position magnets. In particular, vertical orientation is preferred when the disc is used in high density recording. Circumferential orientation can be conducted using spin coating.

In the case of a magnetic tape, orientation is conducted in the machine direction using a cobalt magnet and a solenoid. In orientation, it is preferred that the drying position of the coated film can be controlled by controlling the temperature and the amount of drying air and coating rate. Coating rate is preferably from 20 to 1,000 m/min. and the temperature of drying air is preferably 60° C. or more. Preliminary drying can be performed appropriately before entering the magnet zone.

Use of heat resisting plastic rolls such as epoxy, polyimide, polyamide and polyimideamide, or metal rolls is effective for calendering treatment. Metal rolls are usable for the treatment particularly when magnetic layers are coated on both surface sides. Treatment temperature is preferably 50° C. or more, more preferably 100° C. or more. Line pressure is preferably 200 kg/cm or more, more preferably 300 kg/cm or more.

Physical Properties

Saturation magnetic flux density of the magnetic layer of the magnetic recording medium according to the present invention is generally from 2,000 to 5,000 G when a ferromagnetic metal powder is used, and generally from 1,000 to 3,000 G when a hexagonal ferrite powder is used. Coercive force (Hc) is generally from 1,800 to 5,000 Oe, preferably from 1,900 to 3,000 Oe. Coercive force distribution is preferably narrow, and SFD and SFDr are preferably 0.6 or less. Squareness ratio is generally from 0.55 to 0.67, preferably from 0.58 to 0.64, in the case of two dimensional random orientation, generally from 0.45 to 0.55 in the case of three dimensional random orientation, and in the case of vertical orientation, generally 0.6 or more, preferably 0.7 or more in the vertical direction, and when diamagnetical correction is conducted, generally 0.7 or more, preferably 0.8 or more. Orientation ratio of two dimensional random orientation and three dimensional random orientation is preferably 0.8 or more. In the case of two dimensional random orientation, squareness ratio, Br, Hc and Hr in the vertical direction are preferably from 0.1 to 0.5 times of those in the in-plane direction.

In the case of a magnetic tape, squareness ratio is 0.7 or more, preferably 0.8 or more.

The friction coefficient of the magnetic recording medium according to the present invention against a head at temperature of −10° C. to 40° C. and humidity of 0% to 95% is 0.5 or less, preferably 0.3 or less, the surface inherent resistivity of the magnetic surface is preferably from $10^4$ to $10^{12}$ Ω/sq, the charge potential is preferably from −500 V to +500 V, the elastic modulus at 0.5% elongation of the magnetic layer is preferably from 100 to 2,000 kg/mm$^2$ in every direction of in-plane, the breaking strength is preferably from 10 to 70 kg/mm$^2$, the elastic modulus of the magnetic recording medium is preferably from 100 to 1,500 kg/ mm$^2$ in every direction of in-plane, the residual elongation is preferably 0.5% or less, and the thermal shrinkage factor at every temperature of 100° C. or less is preferably 1% or less, more preferably 0.5% or less, and most preferably 0.1% or less. The glass transition temperature of the magnetic layer (the maximum of elastic modulus loss by dynamic visco-elasticity measurement at 110 Hz) is preferably from 50° C. to 120° C., and that of the nonmagnetic layer is preferably from 0° C. to 100° C. The elastic modulus loss is preferably within the range of from $1\times10^6$ to $8\times10^9$ dyne/cm$^2$, and loss tangent is preferably 0.2 or less. If loss tangent is too large, adhesion failure is liable to occur. These thermal and mechanical characteristics are preferably almost equal in every direction of in-plane of the medium with difference of not more than 10%. The residual amount of the solvent in the magnetic layer is preferably 100 mg/m$^2$ or less, more preferably 10 mg/m$^2$ or less. The void ratio of the coated layer is preferably 30% by volume or less, more preferably 20% by volume or less, with both of the lower layer and the magnetic layer. The void ratio is preferably smaller for obtaining high output but in some cases a specific value should be preferably secured depending on purposes. For example, in a disc-like medium which is repeatedly used, large void ratio contributes to good running durability in many cases.

The magnetic layer has a central plane average surface roughness (Ra) of preferably 4.0 nm or less, more preferably 3.8 μm or less, and particularly preferably 3.5 nm or less, measured by a surface roughness meter "TOPO-3D" (a product of WYKO Co., Ltd., U.S.A.) by MIRAU method. The magnetic layer for use in the present invention preferably has the maximum height (SRmax) of 0.5 μm or less, ten point average roughness (SRz) of 0.3 μm or less, central plane peak height (SRp) of 0.3 μm or less, central plane valley depth (SRv) of 0.3 μm or less, central plane area factor (SSr) of from 20% to 80%, and average wavelength (Sλa) of from 5 μm to 300 μm. For obtaining desired electromagnetic characteristics and a friction coefficient, the number of surface protrusions of the magnetic layer (i.e., height) of sizes of from 0.01 μm to 1 μm can be controlled arbitrarily within the range of from 0 to 2,000 by controlling the surface property by fillers in the support, the particle size and the amount of the magnetic powders added to the magnetic layer, or by the surface shape of rolls of calender treatment. The range of curling is preferably within ±3 mm.

It can be easily presumed that these physical properties can be varied according to purposes in the nonmagnetic layer and the magnetic layer. For example, the elastic modulus of the magnetic layer is made higher to improve running durability and at the same time the elastic modulus of the nonmagnetic layer is made lower than that of the magnetic layer to improve the head touching of the magnetic recording medium.

EXAMPLE

The present invention will be described in detail below with reference to specific examples, but it should not be construed as being limited thereto. In the examples, "part" means "weight part" unless otherwise indicated.

Examples 1 to 25, Comparative Examples 1 to 5 and Reference Example 1

Preparation of Coating Solution

Magnetic Coating Solution: ML-1 (Acicular Ferromagnetic Powder was Used)

| | |
|---|---|
| Ferromagnetic metal powder: M-1 | 100 parts |
| Composition: Co/Fe (atomic ratio), 30% | |
| Hc: 2,550 Oe | |
| Specific surface area: 55 m$^2$/g | |
| σ$_s$: 140 emu/g | |
| Crystallite size: 120 Å | |
| Long axis length: 0.048 μm | |
| Acicular ratio: 4 | |
| Al compound (Al/Fe, atomic ratio: 8%) | |
| Y compound (Y/Fe, atomic ratio: 6%) | |
| Vinyl chloride copolymer | 12 parts |
| MR110 (manufactured by Nippon Zeon Co., Ltd.) | |
| Polyurethane resin | 3 parts |
| UR 8200 (manufactured by Toyobo Co., Ltd.) | |
| α-Alumina | 10 parts |
| HIT55 (manufactured by Sumitomo Chemical Co., Ltd.) | |
| Carbon black | 5 parts |
| #50 (manufactured by Asahi Carbon Co., Ltd.) | |
| Phenylphosphonic acid | 3 parts |
| Butyl stearate | 10 parts |
| Butoxyethyl stearate | 5 parts |
| Isohexadecyl stearate | 3 parts |
| Stearic acid | 2 parts |
| Methyl ethyl ketone | 180 parts |
| Cyclohexanone | 180 parts |

Magnetic Coating Solution: ML-2 (Acicular Ferromagnetic Powder was Used)

| | |
|---|---|
| Ferromagnetic metal powder: M-2 | 100 parts |
| Composition: Co/Fe (atomic ratio), 30% | |
| Hc: 2,360 Oe | |
| Specific surface area: 49 m$^2$/g | |
| $\sigma_s$: 146 emu/g | |
| Crystallite size: 170 Å | |
| Average long axis length: 0.100 μm | |
| Acicular ratio: 6 | |
| SFD: 0.51 | |
| Al compound (AL/Fe, atomic ratio: 5%) | |
| Y compound (Y/Fe, atomic ratio: 5%) | |
| pH: 9.4 | |
| Vinyl chloride copolymer | 10 parts |
| MR110 (manufactured by Nippon Zeon Co., Ltd.) | |
| Polyurethane resin | 4 parts |
| UR 5500 (manufactured by Toyobo Co., Ltd.) | |
| α-Alumina | 10 parts |
| HIT70 (manufactured by Sumitomo Chemical Co., Ltd.) | |
| Carbon black | 1 part |
| #50 (manufactured by Asahi Carbon Co., Ltd.) | |
| Phenylphosphonic acid | 3 parts |
| Oleic acid | 1 part |
| Stearic acid | 0.6 part |
| Ethylene glycol dioleyl | 12 parts |
| Methyl ethyl ketone | 180 parts |
| Cyclohexanone | 180 parts |

Magnetic Coating Solution: ML-3 (Acicular Ferromagnetic Powder was Used, Comparative Example)

| | |
|---|---|
| Ferromagnetic metal powder: M-3 | 100 parts |
| Composition: Fe/Ni, 96/4 | |
| Hc: 1,600 Oe | |
| Specific surface area: 45 m$^2$/g | |
| Crystallite size: 220 Å | |
| $\sigma_s$: 135 emu/g | |
| Average long axis length: 0.20 μm | |
| Acicular ratio: 9 | |
| Vinyl chloride copolymer | 12 parts |
| MR110 (manufactured by Nippon Zeon Co., Ltd.) | |
| Polyurethane resin | 5 parts |
| UR 8600 (manufactured by Toyobo Co., Ltd.) | |
| α-Alumina (average particle size: 0.65 μm) | 2 parts |
| Chromium oxide (average particle size: 0.35 μm) | 15 parts |
| Carbon black (average particle size: 0.03 μm) | 2 parts |
| Carbon black (average particle size: 0.3 μm) | 9 parts |
| Isohexadecyl stearate | 4 parts |
| n-Butyl stearate | 4 parts |
| Butoxyethyl stearate | 4 parts |
| Oleic acid | 1 part |
| Stearic acid | 1 part |
| Methyl ethyl ketone | 300 parts |

Magnetic Coating Solution: ML-4 (Tabular Ferromagnetic Powder was Used)

| | |
|---|---|
| Barium ferrite magnetic powder: M-4 | 100 parts |
| Composition of molar ratio based on Ba: | |
| Fe, 9.10, Co, 0.20, Zn, 0.77 | |
| Hc: 2,500 Oe | |
| Specific surface area: 50 m$^2$/g | |
| $\sigma_s$: 58 emu/g | |
| Average tabular diameter: 35 nm | |
| Tabular ratio: 4 | |
| Vinyl chloride copolymer | 12 parts |
| MR110 (manufactured by Nippon Zeon Co., Ltd.) | |
| Polyurethane resin | 3 parts |
| UR 8200 (manufactured by Toyobo Co., Ltd.) | |
| α-Alumina | 10 parts |
| HIT55 (manufactured by Sumitomo Chemical Co., Ltd.) | |
| Carbon black | 5 parts |
| #50 (manufactured by Asahi Carbon Co., Ltd.) | |
| Phenylphosphonic acid | 3 parts |
| Butyl stearate | 10 parts |
| Butoxyethyl stearate | 5 parts |
| Isohexadecyl stearate | 3 parts |
| Stearic acid | 2 parts |
| Methyl ethyl ketone | 125 parts |
| Cyclohexanone | 125 parts |

Magnetic Coating Solution: ML-5 (Tabular Ferromagnetic Powder was Used)

| | |
|---|---|
| Barium ferrite magnetic powder: M-5 | 100 parts |
| Composition of molar ratio based on Ba: | |
| Fe, 9.10, Co, 0.20, Zn, 0.77 | |
| Hc: 2,500 Oe | |
| Specific surface area: 50 m$^2$/g | |
| $\sigma_s$: 58 emu/g | |
| Average tabular diameter: 35 nm | |
| Tabular ratio: 2.5 | |
| Vinyl chloride copolymer | 10 parts |
| MR110 (manufactured by Nippon Zeon Co., Ltd.) | |
| Polyurethane resin | 4 parts |
| UR 5500 (manufactured by Toyobo Co., Ltd.) | |
| α-Alumina | 10 parts |
| HIT55 (manufactured by Sumitomo Chemical Co., Ltd.) | |
| Carbon black | 1 part |
| #50 (manufactured by Asahi Carbon Co., Ltd.) | |
| Phenylphosphonic acid | 3 parts |
| Oleic acid | 1 part |
| Stearic acid | 0.6 part |
| Ethylene glycol dioleyl | 16 parts |
| Methyl ethyl ketone | 180 parts |
| Cyclohexanone | 180 parts |

Nonmagnetic Coating Solution: NU-1 (Spherical Inorganic Powder was Used)

| | |
|---|---|
| Nonmagnetic powder, TiO$_2$, crystal system rutile | 80 parts |
| Average particle size: 0.035 μm | |
| Specific surface area (S$_{BET}$): 40 m$^2$/g | |
| pH: 7 | |
| TiO$_2$ content: 90% or more | |
| DBP oil absorption: 27 to 38 ml/100 g | |
| Surface-covering compound: Al$_2$O$_3$, 8 wt % based on total particles | |
| Carbon black | 20 parts |
| CONDUCTEX SC-U (manufactured by Columbia Carbon Co., Ltd.) | |
| Vinyl chloride copolymer | 12 parts |
| MR110 (manufactured by Nippon Zeon Co., Ltd.) | |
| Polyurethane resin | 5 parts |
| UR 8200 (manufactured by Toyobo Co., Ltd.) | |
| Phenylphosphonic acid | 4 parts |
| Butyl stearate | 10 parts |
| Butoxyethyl stearate | 5 parts |
| Isohexadecyl stearate | 2 parts |

|   |   |
|---|---|
| Stearic acid | 3 parts |
| Methyl ethyl ketone/cyclohexanone (8/2 mixed solvent) | 250 parts |

Nonmagnetic Coating Solution: NU-2 (Spherical Inorganic Powder was Used)

|   |   |
|---|---|
| Inorganic powder, $TiO_2$, crystal system rutile<br>Average particle size: 0.035 $\mu$m<br>Specific surface area ($S_{BET}$): 40 m$^2$/g<br>pH: 7<br>$TiO_2$ content: 90% or more<br>DBP oil absorption: 27 to 38 ml/100 g<br>Surface-covering compound: $Al_2O_3$ and $SiO_2$ | 100 parts |
| Carbon black<br>Ketjen Black EC (manufactured by Akzo Nobel Co., Ltd.)<br>Average particle size: 30 nm<br>DBP oil absorption: 350 ml/100 g<br>pH: 9.5<br>Specific surface area ($S_{BET}$): 950 m$^2$/g<br>Volatile content: 1.0 wt % | 13 parts |
| Vinyl chloride copolymer<br>MR110 (manufactured by Nippon Zeon Co., Ltd.) | 16 parts |
| Polyurethane resin<br>UR 8200 (manufactured by Toyobo Co., Ltd.) | 6 parts |
| Phenylphosphonic acid | 4 parts |
| Ethylene glycol dioleyl | 16 parts |
| Oleic acid | 1 part |
| Stearic acid | 0.8 part |
| Methyl ethyl ketone/cyclohexanone (8/2 mixed solvent) | 250 parts |

Nonmagnetic Coating Solution: NU-3 (Spherical Inorganic Powder was Used)

|   |   |
|---|---|
| Inorganic powder, $TiO_2$, crystal system rutile<br>Average particle size: 0.035 $\mu$m<br>Specific surface area ($S_{BET}$): 40 m$^2$/g<br>pH: 7<br>$TiO_2$ content: 90% or more<br>DBP oil absorption: 27 to 38 ml/100 g<br>Surface-covering compound: $Al_2O_3$ and $SiO_2$ | 75 parts |
| Carbon black<br>Ketjen Black EC (manufactured by Akzo Nobel Co., Ltd.) | 10 parts |
| $\alpha$-Alumina<br>AKP-15 (manufactured by Sumitomo Chemical Co., Ltd.)<br>Average particle size: 0.65 $\mu$m | 15 parts |
| Vinyl chloride copolymer<br>MR110 (manufactured by Nippon Zeon Co., Ltd.) | 12 parts |
| Polyurethane resin<br>UR 8600 (manufactured by Toyobo Co., Ltd.) | 5 parts |
| Isohexadecyl stearate | 4 parts |
| n-Butyl stearate | 4 parts |
| Butoxyethyl stearate | 4 parts |
| Oleic acid | 1 part |
| Stearic acid | 1 part |
| Methyl ethyl ketone | 300 parts |

Nonmagnetic Coating Solution NU-4 (Acicular inorganic Powder was Used)

|   |   |
|---|---|
| Inorganic powder, $\alpha$—$Fe_2O_3$, hematite<br>Average long axis length: 0.15 $\mu$m<br>Specific surface area ($S_{BET}$): 50 m$^2$/g<br>pH: 9<br>Surface-covering compound: $Al_2O_3$,<br>8 wt % based on total particles | 80 parts |
| Carbon black<br>CONDUCTEX SC-U (manufactured by Columbia Carbon Co., Ltd.) | 20 parts |
| Vinyl chloride copolymer<br>MR110 (manufactured by Nippon Zeon Co., Ltd.) | 12 parts |
| Polyurethane resin<br>UR 8200 (manufactured by Toyobo Co., Ltd.) | 5 parts |
| Phenylphosphonic acid | 4 parts |
| Butyl stearate | 10 parts |
| Butoxyethyl stearate | 5 parts |
| Isohexadecyl stearate | 2 parts |
| Stearic acid | 3 parts |
| Methyl ethyl ketone/cyclohexanone (8/2 mixed solvent) | 250 parts |

Nonmagnetic Coating Solution NU-5 (Acicular Inorganic Powder was Used)

|   |   |
|---|---|
| Inorganic powder, $\alpha$—$Fe_2O_3$, hematite<br>Average long axis length: 0.15 $\mu$m<br>Specific surface area ($S_{BET}$): 50 m$^2$/g<br>pH: 9<br>Surface-covering compound: $Al_2O_3$,<br>8 wt % based on total particles | 100 parts |
| Carbon black<br>#3250B (manufactured by Mitsubishi Kasei Corp.) | 18 parts |
| Vinyl chloride copolymer<br>MR104 (manufactured by Nippon Zeon Co., Ltd.) | 15 parts |
| Polyurethane resin<br>UR 5500 (manufactured by Toyobo Co., Ltd.) | 7 parts |
| Phenylphosphonic acid | 4 parts |
| Ethylene glycol dioleyl | 16 parts |
| Oleic acid | 1.3 parts |
| Stearic acid | 0.8 part |
| Methyl ethyl ketone/cyclohexanone (8/2 mixed solvent) | 250 parts |

Each of the above ten compositions of the coating solutions for the magnetic layer and the nonmagnetic layer was blended in a kneader, then dispersed with a sand mill. Polyisocyanate was added to each resulting dispersion solution, in an amount of 10 parts to the nonmagnetic layer coating solution, and 10 parts to the magnetic layer coating solution. Further, 40 parts of cyclohexanone was added to each solution. Each solution was filtered through a filter having an average pore diameter of 1 $\mu$m to obtain coating solutions for forming the nonmagnetic layer and the magnetic layer.

Preparation Method 1 (W/W): Examples 1 to 19

Example 1

Orientation: O-1

The coating solution containing nonmagnetic coating solution NU-1 and the coating solution containing magnetic coating solution ML-2 were respectively simultaneously multilayer-coated on support B-1 (described below). The nonmagnetic layer coating solution was coated in a dry thickness of 1.5 $\mu$m, immediately thereafter the magnetic layer coating solution was coated on the nonmagnetic layer so as to give the magnetic layer having a thickness of 0.15 $\mu$m. The coated layers were subjected to random orientation while the magnetic layer and the nonmagnetic layer were still wet by passing through an alternating current magnetic field generator having two magnetic field intensities of frequency of 50 Hz, magnetic field intensity of 250 Gauss and frequency of 50 Hz, magnetic field intensity of 120 Gauss. After drying, the coated layers were subjected to calendering treatment with calenders of 7 stages at 90° C. at line pressure of 300 kg/cm. The obtained web was punched to a disc of 3.7 inches, the disc was subjected to a surface treatment by abrasives, encased in 3.7 inch cartridge having a liner inside (a zip-disc cartridge manufactured by Iomega Co., Ltd., U.S.A.) to obtain a 3.7 inch floppy disc.

Examples 2 to 16 and Comparative Examples 1 to 5

Orientation: O-1

Floppy discs (3.7 inches) were prepared in the same manner as in Example 1 except for changing the factors described in Tables 1 and 2 below.

Examples 17 and 18

Orientation: O-2

Floppy discs (3.7 inches) were prepared in the same manner as in Example 1 except for changing the factors described in Table 2 below and subjecting the samples to machine direction orientation using Co magnets with the same pole and counter positions of 4,000 G before random orientation treatment.

Example 19

Orientation: O-3

A 3.7 inch floppy disc was prepared in the same manner as in Example 1 except for changing the factors described in Table 2 below and subjecting the sample to vertical orientation (a magnet of different pole and counter positions was used).

In this Preparation Method 1 (O-1 and O-2), it is preferred to increase the frequency and magnetic field intensity of the alternating current magnetic field generator so as to achieve finally sufficient random orientation, thereby 98% or more of orientation ratio can be obtained.

Further, if necessary, discs after being punched may be subjected to post treatments, e.g., a thermal treatment at high temperature (generally from 50 to 90° C.) to accelerate curing of coated layers, or a burnishing treatment with an abrasive tape to scrape off surface protrusions.

Preparation Method 2 (W/D)

Example 20

Orientation: O-1

The coating solution containing nonmagnetic coating solution NU-5 was coated in a dry thickness of 1.5 μm on support B-1, dried, and subjected to calendering treatment. The coating solution containing magnetic coating solution ML-2 was coated by blade coating on the nonmagnetic layer so as to give the magnetic layer having a thickness of 0.15 μm. The procedure was carried out in the same manner as in Example 1 other than the above.

Calendering of the nonmagnetic layer may be omitted.

Preparation Method 3 (spin coating)

Examples 21 and 22

Orientation: O-4

The coating solution containing nonmagnetic coating solution NU-5 was coated in a dry thickness of 1.5 μm by spin coating on support B-1 and dried. The coating solution shown in Table 2 was coated by spin coating on the nonmagnetic layer so as to give the magnetic layer having a thickness of 0.15 μm. The coated layers were oriented using Co magnets with the same pole and counter positions of 6,000 G in the circumferential direction and the surface of the layer was smoothed by batch system rolling treatment by which the same pressure as in Preparation Method 1 can be applied. The procedure was carried out in the same manner as in Preparation Method 1 hereafter.

Also, the magnetic layer may be coated by spin coating on the nonmagnetic layer while the nonmagnetic layer coated by spin coating is still wet. By using the spin coating process, not only the amount of residual magnetization in the recording direction can be made large but also vertical magnetization components of the barium ferrite powder and the ferromagnetic metal powder of short acicular ratio can be reduced and symmetric property of reproduced wave form can be improved.

Supports which were used are as follows.

Support B-1
 Main polymer: Polyethylene terephthalate
 Filler in the surface layer:
  Average particle size: 0.10 μm
  Density: 12,000,000/mm$^2$
 Central plane average surface roughness: 3.0 nm
 Thickness: 62 μm
 F-5 value:
  MD: 114 MPa, TD: 107 MPa
 Breaking strength:
  MD: 276 MPa, TD: 281 MPa
 Breaking extension:
  MD: 174%, TD: 139%
 Thermal shrinkage factor (80° C., 30 minutes)
  MD: 0.07%, TD: 0.05%
 Thermal shrinkage factor (100° C., 30 minutes)
  MD: 0.2%, TD: 0.3%
 Temperature expansion coefficient:
  Long axis: 15×10$^{-5}$/° C.
  Short axis: 18×10$^{-5}$/° C.
Support B-2
 Main polymer: Polyethylene terephthalate
 Filler in the surface layer:
  Average particle size: 0.29 μm
  Density: 11,900,000/mm$^2$
 Central plane average surface roughness: 4.0 nm
 Thickness: 62 μm
Support B-3
 Main polymer: Polyethylene terephthalate
 Filler in the surface layer:
  Average particle size: 0.05 μm
  Density: 12,300,000/mm$^2$
 Central plane average surface roughness: 2.0 nm
 Thickness: 62 μm
Support B-4
 Main polymer: Polyethylene terephthalate
 Filler in the surface layer:
  Average particle size: 0.10 μm
  Density: 29,500, 000/mm$^2$
 Central plane average surface roughness: 4.2 nm
 Thickness: 62 μm
Support B-5
 Main polymer: Polyethylene terephthalate
 Filler in the surface layer:
  Average particle size: 0.10 μm
  Density: 5,100,000/mm$^2$ Central plane average surface roughness: 2.2 nm
Thickness: 62 μm Support B-6
Main polymer: Polyethylene naphthalate
Filler in the surface layer:
Average particle size: 0.10 μm
Density: 11,500,000/mm²
Central plane average surface roughness: 2.8 nm
Thickness: 55 μm
Thermal shrinkage factor (80° C., 30 minutes)
MD: 0.02%, TD: 0.03%
Thermal shrinkage factor (100° C., 30 minutes)
MD: 0.08%, TD: 0.05%
Temperature expansion coefficient:
Long axis: $10 \times 10^{-5}$/° C.
Short axis: $11 \times 10^{-5}$/° C.

Support B-7: (Comparison)
Main polymer: Polyethylene terephthalate
Filler in the surface layer:
Average particle size: 0.45 μm
Density: 12,200,000/mm²
Central plane average surface roughness: 5.8 nm
Thickness: 62 μm Support B-8: (Comparison)
Main polymer: Polyethylene terephthalate
Filler in the surface layer:
Average particle size: 0.01 μm
Density: 12,100,000/Mm²
Central plane average surface roughness: 0.9 nm
Thickness: 62 μm Support B-9: (Comparison)
Main polymer: Polyethylene terephthalate
Filler in the surface layer:
Average particle size: 0.10 μm
Density: 41,000,000/mm²
Central plane average surface roughness: 6.5 nm
Thickness: 62 μm Support B-10: (Comparison)
Main polymer: Polyethylene terephthalate
Filler in the surface layer:
Average particle size: 0.10 μm
Density: 2,200,000/mm²
Central plane average surface roughness: 0.8 nm
Thickness: 62 μm Support B-11
Main polymer: Aramide
Filler in the surface layer:
Average particle size: 0.08 μm
Density: 18,100,000/mm²
Central plane average surface roughness: 2.8 nm
Thickness: 45 μm
Thermal shrinkage factor (80° C., 30 minutes)
MD: 0%, TD: 0%
Thermal shrinkage factor (100° C., 30 minutes)
MD: 0.001%, TD: 0.001%
Temperature expansion coefficient:
Long axis: $5 \times 10^{-5}$/° C.
Short axis: $6 \times 10^{-5}$/° C.

Orientation methods are as follows:
O-1: Random orientation
O-2: Orientation in the machine direction using a Co magnet first, then random orientation
O-3: orientation in the vertical direction using a Co magnet
O-4: Orientation in the circumferential direction using a Co magnet With respect to the thus-obtained samples, magnetic characteristics, central plane average surface roughness, areal recording density, etc., were determined.

(1) Magnetic Characteristics (Hc)

Magnetic characteristics were measured using a vibrating sample magnetometer (a product of Toei Kogyo Co., Ltd.) at Hm 10 KOe.

(2) Central Plane Average Surface Roughness (Ra)

Surface roughness (Ra) of the area of about 250 μm×250 μm was measured using "TOPO3D" (a product of WYKO Co., Ltd., U.S.A.) by 3D-MIRAU method. The wavelength of measurement was about 650 nm and spherical compensation and cylindrical compensation were applied. Measurement was performed using a light interference type non-contact surface roughness meter.

(3) Areal Recording Density

Areal recording density means a value obtained by multiplying linear recording density by track density.

(4) Linear Recording Density

Linear recording density means a bit number of signals recorded per 1 inch in the recording direction.

(5) Track Density

Track density means a track number per 1 inch.

(6) φm

φm was measured using a vibrating sample magnetometer (a product of Toei Kogyo Co., Ltd.) at Hm 10 KOe.

(7) Error Rate of Disc

The above signals of linear recording density were recorded on the disc by (2,7) RLL modulation system and error rate of the disc was measured.

(8) Thickness of Magnetic Layer

A sample having a thickness of about 0.1 μm was cut out with a diamond cutter in the machine direction of the magnetic medium, observed with a transmission type electron microscope of from 10,000 to 100,000, preferably from 20,000 to 50,000 magnifications and photographed. The print size of the photograph was from A4 (i.e., 297×210 mm) to A5 (i.e., 210×148 mm) sizes. The present inventors paid attentions to the difference of the shapes of the ferromagnetic powders and the nonmagnetic powders of the magnetic layer and the nonmagnetic layer and rimmed the interface of the magnetic layer and the nonmagnetic layer and also the surface of the magnetic layer with black color by visual judgement. Thereafter, the distance of the rimmed lines was measured by the image processing apparatus "IBAS2" (manufactured by Zeiss Corp.). Measurement was conducted from 85 to 300 times when the length of the sample photograph was 21 cm. The average measured value at that time was taken as the magnetic layer thickness.

(9) Average Particle Size of Filler

The average particle size of the filler contained in the surface layer of the support was obtained according to the aforementioned method.

(10) Number of Filler

The number of the filler contained in the surface layer of the support was obtained according to the aforementioned method.

(11) Durability

A floppy disc drive ("ZIP100", a product of I OMEGA CORP., U.S.A., rotation number: 2,968 rpm) was used. The head was fixed at the position of radius of 38 mm. Recording was conducted at recording density of 34 kfci, then reproduced the signals recorded and this was taken as 100%. The disc was run for 1,500 hours under the following thermo-cycle conditions (1) and (2), which being taken as one cycle. Output was monitored every 24 hours of running and the point when the initial reproduction output became 70% or less (H: hour) was taken as NG.

Thermo-Cycle Flow (1): 25° C., 50% RH, 1 hr→(temperature up, 2 hr)→60° C., 20% RH, 7 hr→(temperature down, 2 hr)→25° C., 50% RH, 1 hr→(temperature down, 2 hr)→5° C., 10% RH, 7 hr→(2): (temperature up, 2 hr)→(this cycle was repeated).

| Sample No. | Magnetic Layer ||||| Non-magnetic Coating Solution | Support | Preparation Method | Orientation |
| --- | --- | --- | --- | --- | --- | --- | --- | --- | --- |
| | Magnetic Coating Solution | Thickness ($\mu$m) | Hc (Oe) | Ra (nm) | $\phi$m (emu/cm$^2$) | | | | |
| Example 1 | ML-2 | 0.15 | 2,360 | 3.5 | $4.8 \times 10^{-3}$ | NU-1 | B-1 | Method 1 | O-1 |
| Example 2 | ML-2 | 0.15 | 2,360 | 2.3 | $4.8 \times 10^{-3}$ | NU-2 | B-1 | Method 1 | O-1 |
| Example 3 | ML-2 | 0.15 | 2,360 | 1.9 | $4.8 \times 10^{-3}$ | NU-4 | B-1 | Method 1 | O-1 |
| Example 4 | ML-2 | 0.15 | 2,360 | 1.7 | $4.8 \times 10^{-3}$ | NU-5 | B-1 | Method 1 | O-1 |
| Example 5 | ML-2 | 0.05 | 2,400 | 1.4 | $1.6 \times 10^{-3}$ | NU-5 | B-1 | Method 1 | O-1 |
| Example 6 | ML-2 | 0.10 | 2,380 | 1.6 | $3.2 \times 10^{-3}$ | NU-5 | B-1 | Method 1 | O-1 |
| Example 7 | ML-2 | 0.20 | 2,330 | 1.9 | $6.4 \times 10^{-3}$ | NU-5 | B-1 | Method 1 | O-1 |
| Example 8 | ML-2 | 0.15 | 2,360 | 2.4 | $4.8 \times 10^{-3}$ | NU-5 | B-2 | Method 1 | O-1 |
| Example 9 | ML-2 | 0.15 | 2,360 | 1.4 | $4.8 \times 10^{-3}$ | NU-5 | B-3 | Method 1 | O-1 |
| Example 10 | ML-2 | 0.15 | 2,360 | 3.6 | $4.8 \times 10^{-3}$ | NU-5 | B-4 | Method 1 | O-1 |
| Example 11 | ML-2 | 0.15 | 2,360 | 1.2 | $4.8 \times 10^{-3}$ | NU-5 | B-5 | Method 1 | O-1 |
| Example 12 | ML-2 | 0.15 | 2,360 | 1.6 | $4.8 \times 10^{-3}$ | NU-5 | B-6 | Method 1 | O-1 |
| Example 13 | ML-2 | 0.15 | 2,360 | 1.8 | $4.8 \times 10^{-3}$ | NU-5 | B-11 | Method 1 | O-1 |

| Sample No. | Magnetic Layer ||||| Non-magnetic Coating Solution | Support | Preparation Method | Orientation |
| --- | --- | --- | --- | --- | --- | --- | --- | --- | --- |
| | Magnetic Coating Solution | Thickness ($\mu$m) | Hc (Oe) | Ra (nm) | $\phi$m (emu/cm$^2$) | | | | |
| Comparative Example 1 | ML-2 | 0.15 | 2,360 | 4.1 | $4.8 \times 10^{-3}$ | NU-5 | B-7 | Method 1 | O-1 |
| Comparative Example 2 | ML-2 | 0.15 | 2,360 | 0.9 | $4.8 \times 10^{-3}$ | NU-5 | B-8 | Method 1 | O-1 |
| Comparative Example 3 | ML-2 | 0.15 | 2,360 | 4.3 | $4.8 \times 10^{-3}$ | NU-5 | B-9 | Method 1 | O-1 |
| Comparative Example 4 | ML-2 | 0.15 | 2,360 | 1.0 | $4.8 \times 10^{-3}$ | NU-5 | B-10 | Method 1 | O-1 |
| Example 14 | ML-1 | 0.15 | 2,550 | 2.5 | $4.2 \times 10^{-3}$ | NU-5 | B-1 | Method 1 | O-1 |
| Comparative Example 5 | ML-3 | 0.15 | 1,600 | 3.1 | $4.8 \times 10^{-3}$ | NU-5 | B-1 | Method 1 | O-1 |
| Example 15 | ML-4 | 0.15 | 2,500 | 2.2 | $2.1 \times 10^{-3}$ | NU-5 | B-1 | Method 1 | O-1 |
| Example 16 | ML-5 | 0.15 | 2,500 | 1.8 | $2.4 \times 10^{-3}$ | NU-5 | B-1 | Method 1 | O-1 |
| Example 17 | ML-2 | 0.15 | 2,360 | 1.7 | $4.8 \times 10^{-3}$ | NU-5 | B-1 | Method 1 | O-2 |
| Example 18 | ML-5 | 0.15 | 2,500 | 1.8 | $2.5 \times 10^{-3}$ | NU-5 | B-1 | Method 1 | O-2 |
| Example 19 | ML-4 | 0.15 | 2,700 | 1.9 | $2.3 \times 10^{-3}$ | NU-5 | B-1 | Method 1 | O-3 |
| Example 20 | ML-2 | 0.15 | 2,360 | 2.5 | $4.8 \times 10^{-3}$ | NU-5 | B-1 | Method 2 | O-1 |
| Example 21 | ML-2 | 0.15 | 2,660 | 1.6 | $4.8 \times 10^{-3}$ | NU-5 | B-1 | Method 3 | O-4 |
| Example 22 | ML-4 | 0.15 | 2,700 | 1.8 | $2.3 \times 10^{-3}$ | NU-5 | B-1 | Method 3 | O-4 |

TABLE 3

| Sample No. | Track Density (tpi) | Linear Recording Density (kbpi) | Areal Recording Density (G bit/inch$^2$) | Error Rate ($10^{-5}$) | Durability |
| --- | --- | --- | --- | --- | --- |
| Example 1 | 5,200 | 144 | 0.75 | 0.2 | 1500H< |
| Example 2 | 5,200 | 144 | 0.75 | 0.08 | 1500H< |
| Example 3 | 5,200 | 144 | 0.75 | 0.03 | 1500H< |
| Example 4 | 5,200 | 144 | 0.75 | 0.01 | 1500H< |
| Example 5 | 5,200 | 144 | 0.75 | 0.06 | 1100H |
| Example 6 | 5,200 | 144 | 0.75 | 0.01 | 1500H< |
| Example 7 | 5,200 | 144 | 0.75 | 0.2 | 1500H< |
| Example 8 | 5,200 | 144 | 0.75 | 0.07 | 1500H< |

TABLE 3-continued

| Sample No. | Track Density (tpi) | Linear Recording Density (kbpi) | Areal Recording Density (G bit/inch²) | Error Rate ($10^{-5}$) | Durability |
|---|---|---|---|---|---|
| Example 9 | 5,200 | 144 | 0.75 | 0.008 | 1020H |
| Example 10 | 5,200 | 144 | 0.75 | 0.1 | 1500H< |
| Example 11 | 5,200 | 144 | 0.75 | 0.01 | 1500H< |
| Example 12 | 5,200 | 144 | 0.75 | 0.009 | 1450H |
| Example 13 | 5,200 | 144 | 0.75 | 0.02 | 1320H |
| Comparative Example 1 | 5,200 | 144 | 0.75 | 1.1 | 1500H< |
| Comparative Example 2 | 5,200 | 144 | 0.75 | 0.006 | 520H |
| Comparative Example 3 | 5,200 | 144 | 0.75 | 1.5 | 1500H< |
| Comparative Example 4 | 5,200 | 144 | 0.75 | 0.01 | 600H |
| Example 14 | 5,200 | 144 | 0.75 | 0.004 | 1500H< |
| Comparative Example 5 | 5,200 | 144 | 0.75 | 40 | 1500H< |
| Example 15 | 5,200 | 144 | 0.75 | 0.01 | 1500H< |
| Example 16 | 5,200 | 144 | 0.75 | 0.005 | 1480H |
| Example 17 | 5,200 | 144 | 0.75 | 0.001 | 1340H |
| Example 18 | 5,200 | 144 | 0.75 | 0.0006 | 1280H |
| Example 19 | 5,200 | 144 | 0.75 | 0.0004 | 1400H |
| Example 20 | 5,200 | 144 | 0.75 | 0.1 | 1500H< |
| Example 21 | 5,200 | 144 | 0.75 | 0.0002 | 1080H |
| Example 22 | 5,200 | 144 | 0.75 | 0.0001 | 1500H< |
| Example 23 | 7,500 | 200 | 1.5 | 0.8 | 1340H |
| Example 24 | 6,000 | 166 | 1.0 | 0.08 | 1440H |
| Example 25 | 3,000 | 120 | 0.36 | 0.007 | 1380H |
| Reference Example 1 | 2,000 | 50 | 0.1 | 0.5 | 1480H |

In each of Examples 23 to 25 and Reference Example 1, the disc in Example 19 was used and error rate was determined with varying linear recording density and track density.

As is apparent from the results in Table 3, the error rates of the magnetic recording media according to the present invention, in particular, in high density recording region, are $1 \times 10^{-5}$ or less, which are conspicuously excellent and durability is also remarkably improved as compared with conventional disc-like media. On the other hand, in comparative examples, the improvement of error rate is compatible with the improvement of durability with difficulty, and at least either is inferior as compared with the example of the present invention.

EFFECT OF THE INVENTION

The present invention can be attained by a magnetic recording medium which comprises a support having thereon a substantially nonmagnetic lower layer and a magnetic layer comprising a ferromagnetic metal powder or a ferromagnetic hexagonal ferrite powder dispersed in a binder provided on the lower layer, which is a magnetic recording medium for recording signals of from 0.17 to 2 G bit/inch² of areal recording density, wherein the dry thickness of the magnetic layer is from 0.05 to 0.30 μm, φm is from $10.0 \times 10^{-3}$ to $1.0 \times 10^{-3}$ emu/cm², the coercive force of the magnetic layer is 1,800 Oe or more, and a filler having an average particle size of from 0.05 to 0.3 μm is present on the surface layer of the support in an amount of from 5,000,000 to 30,000,000/mm². The magnetic recording medium having high excellent high density characteristics and excellent durability, in which, in particular, the error rate, output and durability in high density recording region have been markedly improved, which could never be obtained by conventional techniques, could be obtained by adopting the constitution of the present invention.

While the invention has been described in detail and with reference to specific examples thereof, it will be apparent to one skilled in the art that various changes and modifications can be made therein without departing from the spirit and scope thereof.

What is claimed is:

1. A magnetic recording medium which comprises a support having thereon a substantially nonmagnetic lower layer and, disposed thereupon, a magnetic layer comprising a ferromagnetic metal powder or a ferromagnetic hexagonal ferrite powder dispersed in a binder provided on the lower layer, which is a magnetic recording medium for recording signals of 0.17 to 2 G bit/inch² of areal recording density, wherein the dry thickness of the magnetic layer is 0.05 to 0.30 μm, φm is from $10.0 \times 10^{-3}$ to $1.0 \times 10^{-3}$ emu/cm², the coercive force of the magnetic layer is 1,800 Oe or more, and a filler having an average particle size of 0.05 to 0.3 μm is present on both of the surfaces of the support in an amount from 5,000,000 to 30,000,000/mm².

2. The magnetic recording medium as in claim 1, wherein said filler has an average particle size of 0.05 to 0.25 μm and is present on at least one of the surface layers of the support in an amount of 8,000,000 to 30,000,000/mm².

3. The magnetic recording medium as in claim 1, wherein the dry thickness of the magnetic layer is between 0.05 to 0.20 μm, and the magnetic layer includes an abrasive having an average particle size of not more than 0.4 μm.

4. The magnetic recording medium as in claim 1, wherein the magnetic layer has a central plane average surface roughness of not more than 4.0 nm when measured by a 3D-MIRAU method.

5. The magnetic recording medium as in claim 1, wherein the coercive force of the magnetic layer is at least 2,000 Oe.

6. The magnetic recording medium as in claim 1, wherein the magnetic recording medium is a disc-like magnetic recording medium.

7. The magnetic recording medium as in claim 1, wherein the magnetic recording medium is a computer tape.

* * * * *

UNITED STATES PATENT AND TRADEMARK OFFICE
CERTIFICATE OF CORRECTION

PATENT NO.      : 6,444,290 B1
DATED           : September 3, 2002
INVENTOR(S)     : Masatoshi Takahasi et al.

It is certified that error appears in the above-identified patent and that said Letters Patent is hereby corrected as shown below:

<u>Title page,</u>
Add the following:
-- [30]     Foreign Application Priority Data
June 11, 1998  (JP)    Japan ................................ 10-163656 --.

Signed and Sealed this

Twenty-fifth Day of March, 2003

JAMES E. ROGAN
*Director of the United States Patent and Trademark Office*